(12) United States Patent
Ishiguro et al.

(10) Patent No.: US 7,224,804 B2
(45) Date of Patent: May 29, 2007

(54) INFORMATION PROCESSING DEVICE, INFORMATION PROCESSING METHOD, AND PROGRAM STORAGE MEDIUM

(75) Inventors: Ryuji Ishiguro, Tokyo (JP); Tomoyuki Asano, Kanagawa (JP)

(73) Assignee: Sony Corporation (JP)

( * ) Notice: Subject to any disclaimer, the term of this patent is extended or adjusted under 35 U.S.C. 154(b) by 865 days.

(21) Appl. No.: 10/169,653

(22) PCT Filed: Nov. 9, 2001

(86) PCT No.: PCT/JP01/09841
§ 371 (c)(1),
(2), (4) Date: Oct. 10, 2002

(87) PCT Pub. No.: WO02/39655
PCT Pub. Date: May 16, 2002

(65) Prior Publication Data
US 2003/0105956 A1    Jun. 5, 2003

(30) Foreign Application Priority Data
Nov. 9, 2000    (JP)    ............... 2000-341431

(51) Int. Cl.
*H04L 9/00*    (2006.01)
(52) U.S. Cl. ..................... 380/279; 380/277
(58) Field of Classification Search ............. 713/155; 380/277
See application file for complete search history.

(56) References Cited

U.S. PATENT DOCUMENTS 5,903,651 A    5/1999    Kocher
5,949,877 A    9/1999    Traw et al.
6,049,878 A    4/2000    Caronni et al.
6,397,329 B1 *    5/2002    Aiello et al. ............ 713/155

FOREIGN PATENT DOCUMENTS

| EP | 0 930 556 A2 | 1/1999 |
|---|---|---|
| JP | 11-187013 A1 | 7/1999 |
| JP | 11-205305 A1 | 7/1999 |

OTHER PUBLICATIONS

Menezes, A. et al., "Handbook of Applied Cryptography", 1997, p. 3, pp. 551-560.
"5C Digital Transmission Content Protection White Paper", Revision 1.0, (1998), pp. 1-13 (http://www.dtcp.com).
Wong, C. K. et al., "Secure Group Communications Using Key Graphs", In: Proceedings of ACM SIGCOMM'98, (1998), pp. 68 to 79, (http://www.acm.org/sigcomm/sigcomm98/tp/technical.html).
Waldvogel, M. et al., "The VersaKey Framework: Versatile Group Key Management", IEEE Journal on Selected Areas in Communications, Sep. 1999, vol. 17, No. 9, pp. 1614 to 1631.

* cited by examiner

Primary Examiner—Gilberto Barrón, Jr.
Assistant Examiner—Roderick Tolentino
(74) Attorney, Agent, or Firm—Lerner, David, Littenberg, Krumholz & Mentlik, LLP

(57) ABSTRACT

In an information processing system and method which enables detection processing of a revoked entity using an enabling key block (EKB), a device or a service provider as a revoked entity is determined on the basis of the enabling key block (EKB) used for key distribution in a tree structure. ID which enables position identification in the hierarchical key distribution tree is stored in a public key certificate and tracing processing using a tag of the enabling key block (EKB) is executed on the basis of the ID acquired from the public key certificate, thus determining whether or not the ID is of a position where EKB processing (decryption) is possible and determining the presence/absence of revocation of an entity corresponding to the ID.

11 Claims, 17 Drawing Sheets

| VERSION : t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG.4A

| VERSION : t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

FIG.4B

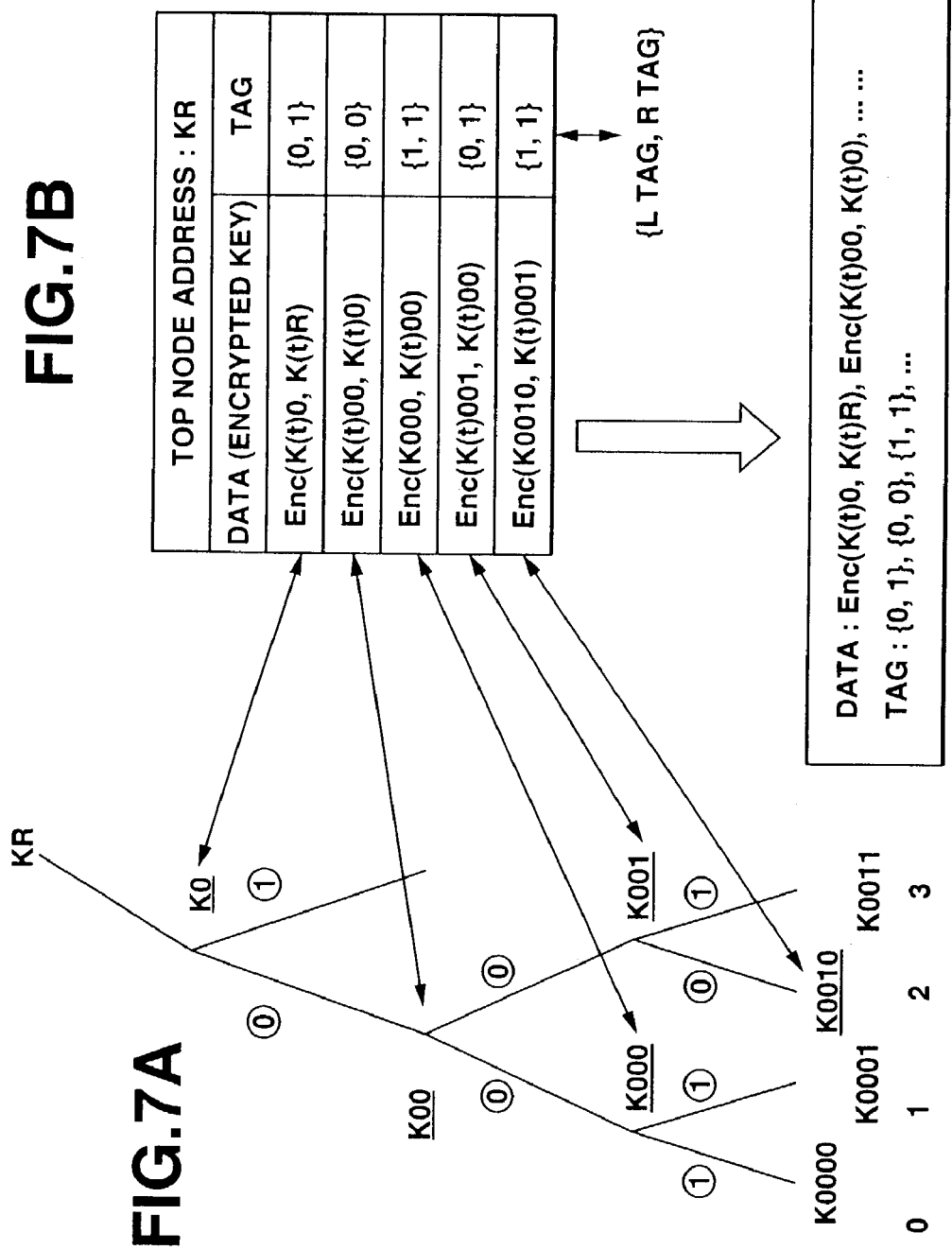

INFORMATION PROCESSING DEVICE, INFORMATION PROCESSING METHOD, AND PROGRAM STORAGE MEDIUM

TECHNICAL FIELD

This invention relates to an information processing device, an information processing method and a program storage medium. Particularly, this invention relates to a system for distributing an encryption processing key in a system involving encryption processing and a method therefor, and more specifically to a system and a method which enable efficient execution of revocation of a specific device by using a tree-structured hierarchical key distribution system.

BACKGROUND ART

Conventionally, distribution of various software such as game programs, audio data and image data (hereinafter referred to as contents) via a network such as the Internet or distributable storage media such as DVDs and CDs has been popularized. These distributed contents are used by receiving the data or loading the storage media to reproduce the data at a PC (personal computer) or a game machine owned by a user, or by storing the data to a recording device within a recording/reproducing equipment appended to a PC or the like, such as a memory card or a hard disk, and newly reproducing the data from the storage medium.

An information equipment such as a video game machine or PC has an interface for receiving a distributed content or accessing a DVD or CD. The information equipment also has control means necessary for reproducing the content, and a RAM and a ROM used as memory areas for programs and data.

Various contents such as music data, image data or programs are accessed from a storage medium in accordance with a user's instruction from an information equipment body such as a game machine or PC used as a reproducing equipment, or in accordance with a user's instruction through input means connected thereto. Alternatively, these contents are reproduced through a connected display or speaker.

In general, with respect to many software contents such as game programs, music data and image data, the producers and sellers own the distribution rights. Therefore, in distributing these contents, a predetermined limitation of use is provided. That is, a system in consideration of security is employed in which only an authorized user is permitted to use the software while unauthorized copying is prevented.

One technique to realize the limitation of use by users is encryption processing of distributed contents. For example, various contents such as encrypted audio data, image data and game programs are distributed via the Internet or the like, and means for decrypting the distributed encrypted contents, that is, a decryption key, is provided only to a person who has been confirmed as an authorized user.

The encrypted data can be transformed back to usable decrypted data (plaintext) by decryption processing through a predetermined procedure. Such a data encryption and decryption method has been conventionally well known, in which an encryption key is used for information encryption processing while a decryption key is used for decryption processing.

There are various types of modes for the data encryption and decryption method using the encryption and decryption keys. One example thereof is a so-called common key encryption system. The common key encryption system is adapted for setting a common key as an encryption key used for data encryption processing and as a decryption key used for decryption of data and providing the common key used for the encryption processing and decryption to an authorized user, thereby eliminating data access by invalid users who have no key. A typical example of this system is DES (data encryption standard).

The encryption and decryption keys used for the above-described encryption processing and decryption can be acquired by applying a unidirectional function such as a hash function, for example, on the basis of a certain password or the like. A unidirectional function is a function such that it is very difficult to retroactively find an input from its output. For example, a unidirectional function is applied where a password decided by a user is an input, and encryption and decryption keys are generated on the basis of its output. It is practically impossible to retroactively find the password, which is the original data, from the encryption and decryption keys generated in the above-described manner.

A system in which different algorithms are used in the processing based on the encryption key for encryption and the processing based on the decryption key for decryption is a so-called public key encryption system. The public key encryption system is a technique in which unspecified users use an available public key. A text to be encrypted, addressed to a specified individual, is encrypted by using a public key issued by the specified individual. The text encrypted by using the public key can be decrypted only by using a private key corresponding to the public key used in the encryption processing. Since the private key is owned only by the individual who issued the public key, the text encrypted by using the public key can be decrypted only by the individual who has the private key. A typical example of the public key encryption system is the RSA (Rivest-Shamir-Adleman) scheme. By utilizing such an encryption system, it is possible to provide a system in which encrypted contents can be decrypted only by an authorized user.

In the content distribution system as described above, a method is often employed in which a content is encrypted and provided through a network or stored onto a recording medium such as a DVD or CD, which is then provided, and then a content key for decrypting the encrypted content is provided only a valid user. It has been proposed to encrypt the content key itself and provide the encrypted content key in order to prevent invalid copying of the content key so that the encrypted content key can be decrypted and made usable by using a decryption key which is owned only by the valid user.

Whether a user is a valid user or not is determined by executing authentication processing before the distribution of a content or content key, generally between a content provider as a transmitter of the content and a user device, or between user devices which transmit and receive the content.

However, in a certain case, for example, the private key of a user's device might be revealed, and an invalid user device might receive a content, storing that private key and pretending to be the invalid device. To cope with such a case, a key control center distributes a revocation list called invalid device list or blacklist containing IDs of invalid devices, to valid devices, and the valid devices use the revocation list to confirm whether ID of a communicating party is included in the list or not.

The revocation list is prepared by listing IDs of invalid devices and appending the signature of the key issuing center for preventing falsification. The revocation list is called CRL (certification revocation list), which is sequentially updated and distributed to the valid devices every time a new invalid device is generated. However, as the number of invalid devices increases, the number of IDs of the invalid devices recorded in the revocation list simply increases. Therefore, the size (data volume) of the list expands and the burden of distribution of the list data becomes heavier. Moreover, storing and saving the list in the valid devices as the destinations of distribution will be a burden on the storage space.

DISCLOSURE OF THE INVENTION

In view of the foregoing problem of the processing burden due to the increase of the data of the revocation list and the problem of the storage space for storing the list in the device, it is an object of the present invention to provide an information processing device, an information processing method and a program storage medium which enable detection and revocation of invalid devices by using a tree-structured hierarchical key distribution system without using the ID list of the invalid devices.

An information processing device according to the present invention, associated with respective leaves of a hierarchical tree structure in which unique keys are associated with nodes and leaves, has a key set stored therein, the key set consisting of leaf key corresponding to each leaf of the hierarchical tree structure and node keys on paths to upper layers. The information processing device comprises a constitution for executing verification processing as to whether an entity corresponding to a node or a leaf is a revocation entity, which is an entity to be revoked, by determining whether or not an enabling key block (EKB) including encrypted key data resulting from encryption of a renewal node key of the hierarchical tree structure by a subordinate node key or a leaf key can be decrypted by a stored key set for an entity to be verified. The determination as to whether decryption is possible or not is executed by trace processing of a key location identification tag in the enabling key block (EKB) based on an identifier of the entity to be verified.

In the information processing device according to the present invention, the identifier of the entity to be verified includes position information of the corresponding node or leaf of the entity in the hierarchical tree structure, and the key location identification tag in the enabling key block (EKB) is constituted as a tag for identifying the presence or absence of encrypted key data on a subordinate layer of each of the encrypted key data in the enabling key block (EKB). The trace processing is executed as the processing for tracing the tag on the basis of the position information of the entity in the hierarchical tree structure, included in the identifier of the entity to be verified.

Moreover, in the information processing device according to the present invention, the identifier of the entity to be verified includes position information of the corresponding node or leaf of the entity in the hierarchical tree structure, and the key location identification tag in the enabling key block (EKB) is constituted as a tag for identifying the presence or absence of encrypted key data on a subordinate layer of each of the encrypted key data in the enabling key block (EKB). In this information processing device, determination as to whether the node position or leaf position corresponding to the entity to be verified can be reached or not is executed by the trace processing of the tag based on the identifier of the entity to be verified, and in case the position cannot be reached, determination as to whether decryption is possible or not is executed by determining whether it belongs to a subordinate layer of a node key that is not renewed.

Furthermore, in the information processing device according to the present invention, the identifier of the entity to be verified is an identifier stored in a public key certificate of the entity. In the information processing device, the identifier of the entity to be verified is acquired from the public key certificate of the entity.

Moreover, in the information processing device according to the present invention, in decrypting an encrypted content provided from an entity corresponding to a node or leaf constituting the hierarchical tree structure, the identifier of the entity is acquired from a public key certificate of the entity and the trace processing of the tag of the enabling key block (EKB) based on the acquired identifier is executed, thus determining whether the entity is a revocation entity or not and executing decryption processing of the encrypted content based on a content encryption key Kcon acquired from the enabling key block (EKB).

According to the present invention, there is also provided an information processing method in an information processing device, associated with respective leaves of a hierarchical tree structure in which unique keys are associated with nodes and leaves, having a key set stored therein, the key set consisting of leaf key corresponding to each leaf of the hierarchical tree structure and node keys on paths to upper layers. The information processing method comprises a constitution for executing verification processing as to whether an entity corresponding to a node or a leaf is a revocation entity, which is an entity to be revoked, by determining whether or not an enabling key block (EKB) including encrypted key data resulting from encryption of a renewal node key of the hierarchical tree structure by a subordinate node key or a leaf key can be decrypted by a stored key set for an entity to be verified. The determination as to whether decryption is possible or not is executed by trace processing of a key location identification tag in the enabling key block (EKB) based on an identifier of the entity to be verified.

Moreover, in the information processing method according to the present invention, the identifier of the entity to be verified includes position information of the corresponding node or leaf of the entity in the hierarchical tree structure, and the key location identification tag in the enabling key block (EKB) is constituted as a tag for identifying the presence or absence of encrypted key data on a subordinate layer of each of the encrypted key data in the enabling key block (EKB). The trace processing is executed as the processing for tracing the tag on the basis of the position information of the entity in the hierarchical tree structure, included in the identifier of the entity to be verified.

In the information processing method according to the present invention, the identifier of the entity to be verified includes position information of the corresponding node or leaf of the entity in the hierarchical tree structure, and the key location identification tag in the enabling key block (EKB) is constituted as a tag for identifying the presence or absence of encrypted key data on a subordinate layer of each of the encrypted key data in the enabling key block (EKB). In this information processing method, determination as to whether the node position or leaf position corresponding to the entity to be verified can be reached or not is executed by the trace processing of the tag based on the identifier of the entity to be verified, and in case the position cannot be reached, determination as to whether decryption is possible or not is executed by determining whether it belongs to a subordinate layer of a node key that is not renewed.

Furthermore, in the information processing method according to the present invention, the identifier of the entity to be verified is an identifier stored in a public key certificate of the entity. In the information processing method, the identifier of the entity to be verified is acquired from the public key certificate of the entity.

Moreover, in the information processing method according to the present invention, in decrypting an encrypted content provided from an entity corresponding to a node or leaf constituting the hierarchical tree structure, the identifier of the entity is acquired from a public key certificate of the entity and the trace processing of the tag of the enabling key block (EKB) based on the acquired identifier is executed, thus determining whether the entity is a revocation entity or not and executing decryption processing of the encrypted content based on a content encryption key Kcon acquired from the enabling key block (EKB).

According to the present invention, there is also provided a program storage medium for providing a computer program which causes a computer system to execute information processing in an information processing device, associated with respective leaves of a hierarchical tree structure in which unique keys are associated with nodes and leaves, having a key set stored therein, the key set consisting of leaf key corresponding to each leaf of the hierarchical tree structure and node keys on paths to upper layers. The computer program stored in the storage medium comprises a verification processing step as to whether an entity corresponding to a node or a leaf is a revocation entity as an entity to be revoked, the verification processing step including a step of execution by determining whether or not an enabling key block (EKB) including encrypted key data resulting from encryption of a renewal node key of the hierarchical tree structure by a subordinate node key or a leaf key can be decrypted by a stored key set for an entity to be verified. The step of determining whether decryption is possible or not includes a step of execution by trace processing of a key location identification tag in the enabling key block (EKB) based on an identifier of the entity to be verified.

The program storage medium according to the present invention is a medium for providing the computer program in a computer-readable format to, for example, a general-purpose computer system capable of executing various program codes.

Such a program storage medium defines a structurally and functionally cooperative relation between a computer program and a storage medium in order to realize the function of a predetermined computer program on the computer system. That is, by installing the computer program into the computer system via the storage medium, cooperative actions are exerted on the computer system.

The other objects, features and advantages of the present invention will be made clear from the following detailed description of embodiments of the present invention and the accompanying drawings.

BRIEF DESCRIPTION OF THE DRAWINGS

FIGS. 4A and 4B show examples of an enabling key block (EKB) used for distribution of various keys and data to the information processing device according to the present invention.

FIGS. 7A, 7B and 7C illustrate the structure of a tag of the enabling key block (EKB).

BEST MODE FOR CARRYING OUT THE INVENTION

Figure 1:
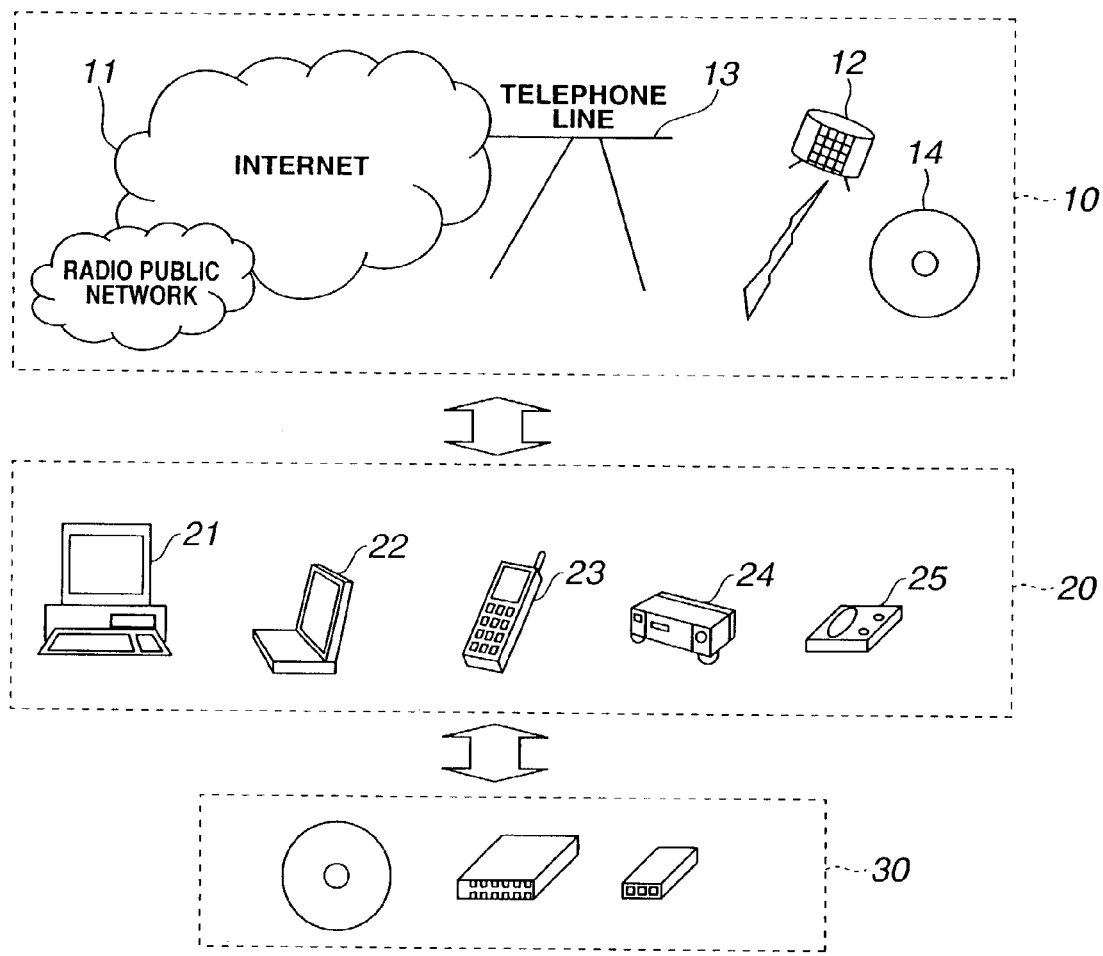
FIG. 1 is a block diagram showing a content distribution system to which an information processing device according to the present invention is applied.

A content distribution system to which the processing in the information processing device according to the present invention is applicable is constituted as shown in FIG. 1.

In the system shown in FIG. 1, a content distribution side 10 encrypts a content or content key and transmits the encrypted content or content key to various equipments which are provided on a content receiving side 20 and capable of reproducing the content. The equipments on the receiving side 20 decrypt the received encrypted content or encrypted content key to acquire the content or content key and carry out reproduction of image data and audio data or execute various programs. The data exchange between the content distribution side 10 and the content receiving side 20 is carried out via a network such as the Internet, or through a distributable storage medium such as DVD or CD.

Data distribution means on the content distribution side 10 include the Internet 11, a broadcasting satellite 12, a telephone line 13 and a medium 14 such as DVD or CD. Devices on the content receiving side 20 include a personal computer (PC) 21, a portable device (PD) 22, a portable equipment 23 such as a portable telephone or PDA (personal digital assistant), a recording/reproducing unit 24 such as a DVD or CD player, and a reproduction-only unit 25 such as a game terminal. These devices on the content receiving side 20 acquires the content provided from the content distribution side 10 through communication means such as a network or through a medium 30.

Figure 2:
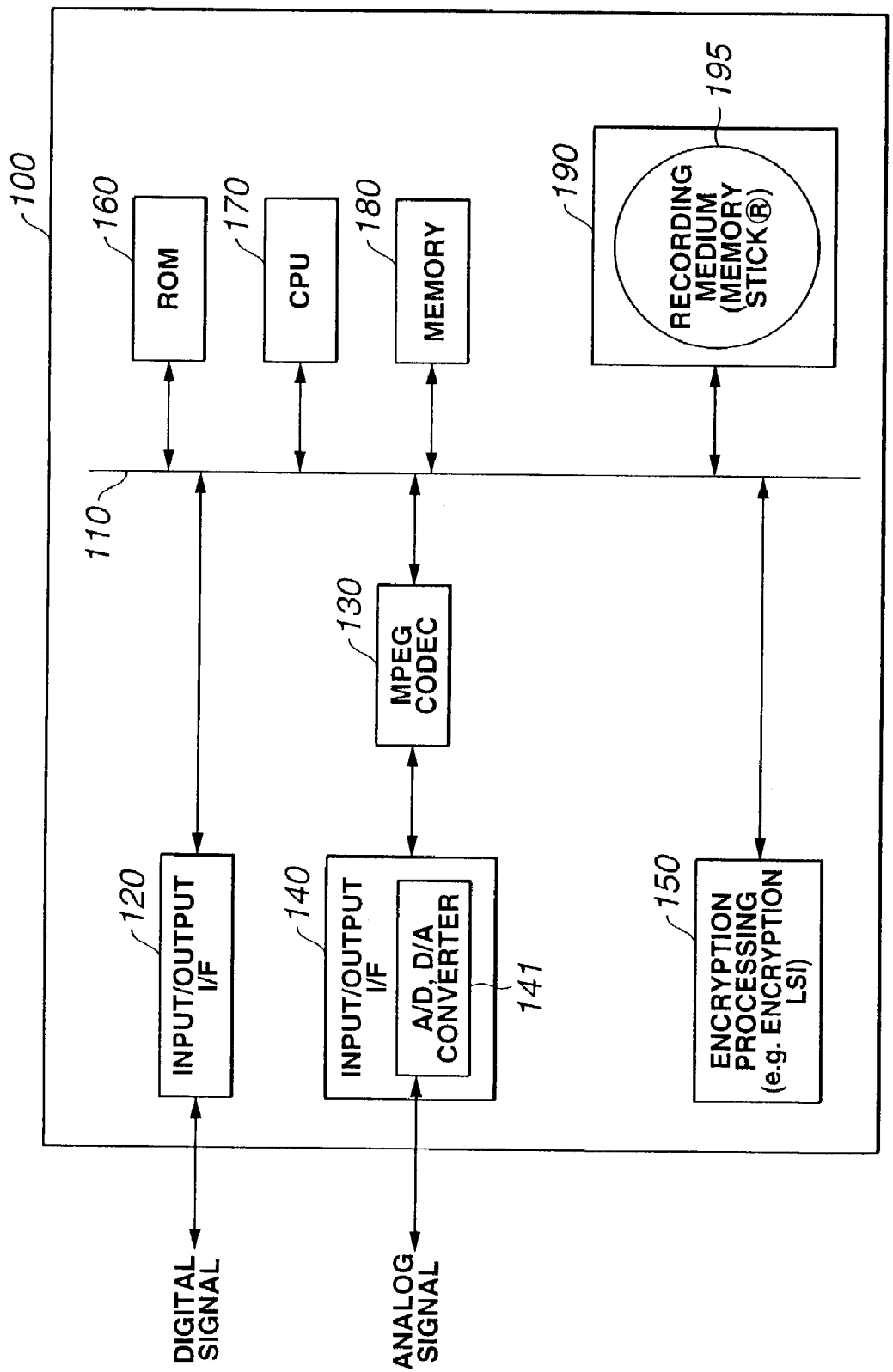
FIG. 2 is a block diagram showing a recording/reproducing device to which the information processing device according to the present invention is applied.

As an example of the information processing devices on the content receiving side 20 shown in FIG. 1, a block diagram of the structure of a recording/reproducing device 100 is shown in FIG. 2. The recording/reproducing device 100 has an input/output I/F (interface) 120, an MPEG (Moving Picture Experts Group) codec 130, an input/output I/F (interface) 140 having an A/D and D/A converter 141., encryption processing means 150, a ROM (read-only memory) 160, a CPU (central processing unit) 170, a memory 180, and a drive 190 for a recording medium 195. These units are interconnected by a bus 110.

The input/output I/F 120 receives digital signals constituting various contents such as images, sounds and programs supplied from outside and outputs these digital signals onto the bus 110. The input/output I/F 120 also receives digital signals on the bus 110 and outputs these digital signals to outside. The MPEG codec 130 performs MPEG decoding of MPEG-coded data supplied via the bus 110 and outputs the MPEG-decoded data to the input/output I/F 140. The MPEG codec 130 also performs MPEG coding of digital signals supplied from the input/output I/F 140 and outputs the MPEG-coded digital signals onto the bus 110. The input/output I/F 140 has the A/D and D/A converter 141 provided therein. The input/output I/F 140 receives an analog signals as contents supplied from outside and performs A/D (analog-to-digital) conversion of the analog signals by the A/D and D/A converter 141, thus outputting digital signals to the MPEG codec 130. The input/output I/F 140 also performs D/A (digital-to-analog) conversion of the digital signals from the MPEG codec 130 by the A/D and D/A converter 141, thus outputting analog signals to outside.

The encryption processing means 150 is constituted by, for example, one-chip LSI (large-scale integrated circuit) and is adapted for executing encryption and decryption processing or authentication processing of digital signals as contents supplied via the bus 110 and outputting the encrypted data, decrypted data and the like to the bus 110. The encryption processing means 150 can be realized not only by the one-chip LSI but also by a combination of various software or hardware. The processing means constituted by the software will be described later.

The ROM 160 stores program data processed by the recording/reproducing device. The CPU 170 executes the programs stored on the ROM 160 and memory 180, thus controlling the MPEG codec 130, the encryption processing means 150 and the like. The memory 180 is, for example, a non-volatile memory, which stores the programs executed by the CPU 170, data necessary for the operation of the CPU 170, and a key set used for encryption processing executed by the device. The key set will be described later. The drive 190 drives the recording medium 195 on which digital data can be recorded and reproduced, thus reading out (reproducing) digital data from the recording medium 195 and outputting the read digital data onto the bus 110. The drive 190 also supplies digital data supplied via the bus 110, to the recording medium 195 and causes the digital data to be recorded on the recording medium 195.

The recording medium 195 is a medium on which digital data can be stored, for example, an optical disc such as DVD or CD, a magneto-optical disc, a magnetic tape, or a semiconductor memory such as RAM. In this embodiment, the recording medium 195 can be mounted on/removed from the drive 190. The recording medium 195 may also be provided within the recording/reproducing device 100.

The encryption processing means 150 shown in FIG. 2 may be constituted as a one-chip LSI or may be realized as a combination of software and hardware.

A mechanism for holding an encryption processing key and a data distribution structure in each device in the case where encrypted data is distributed from the content distribution side 10 to each device on the content receiving side 20 shown in FIG. 1 will now be described with reference to FIG. 3.

Figure 3:
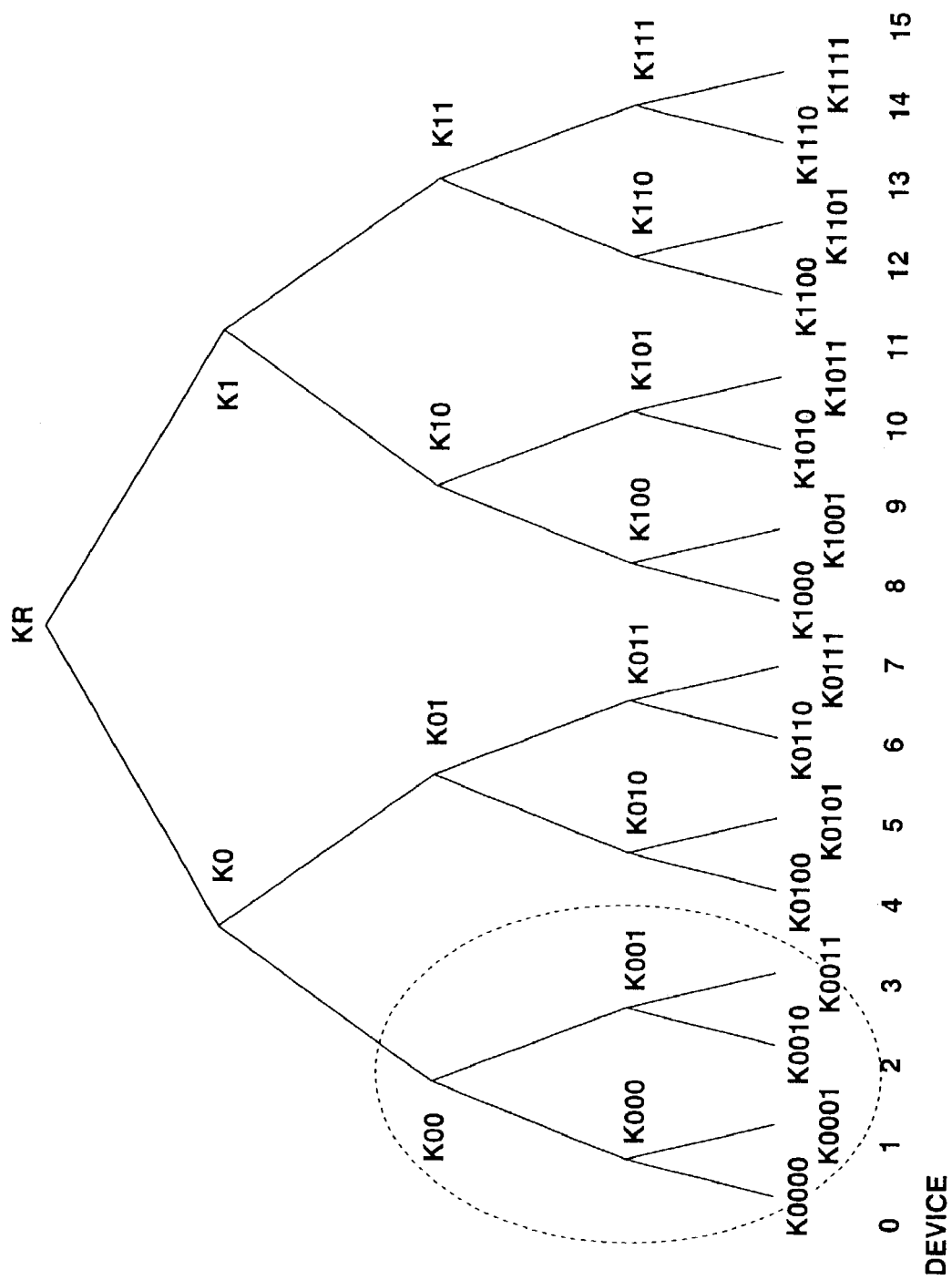
FIG. 3 is a tree-structure diagram for explaining encryption processing of various keys and data, executed in the information processing device according to the present invention.

Numbers 0 to 15 shown on the bottom of FIG. 3 represent the individual devices on the content receiving side 20. That is, leaves of a hierarchical tree structure of FIG. 3 correspond to the respective devices.

At the time of manufacture or shipment, or after that, each of the devices 0 to 15 stores into the memory a key set consisting of node keys allocated to nodes to reach the root from each device's own leaf and a leaf key of the device's own leaf in the hierarchical tree structure shown in FIG. 3. Keys K0000 to K1111 shown on the bottom of FIG. 3 are leaf keys allocated to the devices 0 to 15, respectively. A key KR (root key) on the top to keys described at the second nodes from the bottom, that is, keys KR to K111, are node keys.

In the tree structure shown in FIG. 3, for example, the device 0 holds a leaf key K0000 and node keys K000, K00, K0 and KR. The device 5 holds keys K0101, K010, K01, K0 and KR. The device 15 holds keys K1111, K111, K11, K1 and KR. In the tree of FIG. 3, only the 16 devices 0 to 15 are described and the tree structure is a horizontally symmetrical four-stage structure. However, more devices may be formed in the tree and different stages can be provided in the respective parts of the tree.

The information processing devices contained in the tree structure of FIG. 3 include various types of information processing devices which use various recording media, for example, DVD, CD, MD and flash memory embedded in the devices or attachable to/removable from the devices. Moreover, various application services can coexist. The hierarchical tree structure as a content or key distribution structure shown in FIG. 3 is applied to such a configuration in which different devices and different applications coexist.

In the system where these various information processing devices and applications coexist, for example, the devices 0, 1, 2 and 3 are set as one group which uses the same recording medium, as indicated by a part surrounded by a dotted line in FIG. 3. For example, to the devices included in the group surrounded by the dotted line, processing is executed for collectively encrypting a common content and sending it from a provider, or sending a content key commonly used by the devices, or encrypting content fee payment data and outputting the encrypted content fee payment data from each device to the provider or a settlement institution. The institution such as the content provider or the settlement institution, which transmits and receives data to and from each device, executes processing for sending data in a batched manner to the part surrounded by the dotted line in FIG. 3, that is, the devices 0, 1, 2 and 3 as one group. A plurality of such groups exist in the tree of FIG. 3. The institution such as the content provide or the settlement institution, which transmits and receives data to and from each device, functions as message data distribution means.

The node keys and the leaf keys may be collectively controlled by a single key control center. Alternatively, each group of the node keys and the leaf keys may be controlled by the message data distribution means such as the provider or the settlement institution, which transmits and receives various data to and from each group. These node keys and leaf keys are renewed, for example, in the case of key leak or the like. The renewal processing is carried out by the key control center, the provider or the settlement institution.

As is clear from FIG. 3, in this tree structure, the three devices 0, 1, 2 and 3 included in the one group hold common keys K00, K0 and KR as node keys. By utilizing this node key-shared structure, for example, it is possible to a common content key only to the devices 0, 1, 2 and 3. For example, by setting the commonly held node key K00 itself as a content key, it is possible to set a content key that is common only to the devices 0, 1, 2 and 3 without newly sending a key. Moreover, by distributing a value Enc (K00, Kcon), obtained by encrypting a new content key Kcon by the node key K00, to the devices 0, 1, 2 and 3 via a network or a recording medium, it is possible that only the devices 0, 1, 2 and 3 decrypt the value Enc (K00, Kcon) by using the common node key K00 held in the respective devices and thus acquire the content key Kcon. Enc (Ka, Kb) represents data obtained by encrypting Kb by Ka.

If it is revealed at a certain time point t that the keys K0011, K001, K00, K0 and KR held by the device 3 were analyzed and exposed by a hacker, the device 3 must be then disconnected from the system in order to protect data transmitted and received in the system (the group consisting of the devices 0, 1, 2 and 3). To this end, the node keys K001, K00, K0 and KR must be renewed to new keys K(t)001, K(t)00, K(t)0 and K(t)R, and the renewal keys must be transmitted to the devices 0, 1 and 2. K(t)aaa represents a renewal key of a generation t of a key Kaaa.

The distribution processing of a renewal key will now be described. The renewal of a key is carried out by supplying a table constituted by block data called enabling key block (EKB) shown in FIG. 4A to the devices 0, 1 and 2, for example, via a network or a recording medium. The enabling key block (EKB) is constituted by an encryption key for distributing a renewed key to devices corresponding to respective leaves forming a tree structure as shown in FIG. 3. The enabling key block (EKB) may also be referred to as key renewal block (KRB).

The enabling key block (EKB) shown in FIG. 4A is constituted as block data having a data structure renewable only by a device which requires renewal of a node key. The example shown in FIG. 4A represents block data formed for the purpose of distributing a renewal node key of a generation t to the devices 0, 1 and 2 in the tree structure shown in FIG. 3. As is clear from FIG. 3, the device 0 and the device 1 need K(t)00, K(t)0 and K(t)R as renewal node keys, and the device 2 needs K(t)001, K(t)00, K(t)0 and K(t)R as renewal node keys.

As is shown in the EKB of FIG. 4A, an EKB contains a plurality of encryption keys. An encryption key on the bottom is Enc(K0010, K(t)001). This is a renewal node key K(t)001 encrypted by the leaf key K0010 held by the device 2. The device 2 can decrypt this encrypted key by using the leaf key held by the device 2 itself, thus acquiring K(t)001. Using K(t)001, which is acquired by the decryption, an encrypted key Enc(K(t)001, K(t)00) on the second stage from the bottom of FIG. 4A can be decrypted and a renewal node key K(t)00 can be thus obtained. Similarly, an encrypted key Enc(K(t)00, K(t)0) on the second stage from the stop of FIG. 4A is decrypted to generate a renewal node key K(t)0, and an encrypted key Enc(K(t)0, K(t)R) on the top of FIG. 4A is decrypted to generate K(t)R. As for the devices 0 and 1, the node key K000 is not included as an object of renewal and K(t)00, K(t)0 and K(t)R are required as renewal node keys. The devices 0 and 1 decrypt an encrypted key Enc(K000, K(t)00) on the third stage from the top of FIG. 4A, thus acquiring K(t)00. Then, the encrypted key Enc(K(t)00, K(t)0) on the second stage from the top of FIG. 4A is decrypted to generate the renewal node key K(t)0, and the encrypted key Enc(K(t)0, K(t)R) on the top of FIG. 4A is decrypted to generate K(t)R. In this manner, the devices 0, 1 and 2 can acquire the renewed key K(t)R. The indexes in FIG. 4A represent the absolute addresses of the node keys and the leaf keys used as decryption keys.

If renewal of the node keys K(t)0 and K(t)R on the upper level of the tree structure shown in FIG. 3 is not necessary and only the node key K00 needs to be renewed, the renewal node key K(t)00 can be distributed to the devices 0, 1 and 2 by using an enabling key block (EKB) shown in FIG. 4B.

The EKB shown in FIG. 4B is usable in the case of distributing, for example, a new content key shared in a specified group. As a specific example, it is assumed that the devices 0, 1, 2 and 3 in the group indicated by the dotted line in FIG. 3 use a certain recording medium and that a new common content key K(t)con is required. In this case, data Enc(K(t), K(t)con) obtained by encrypting the new common content key K(t)con by using the common node key K00 of the devices 0, 1, 2 and 3 is distributed together with the EKB shown in FIG. 4B. This enables distribution of the data in such a manner that the data cannot be decrypted by any equipment in the other groups, for example, the device 4.

That is, by decrypting the encrypted text by using K(t)00 resulting from the processing of the EKB, the devices 0, 1 and 2 can acquire the content key K(t)con at the time point t.

Figure 5:
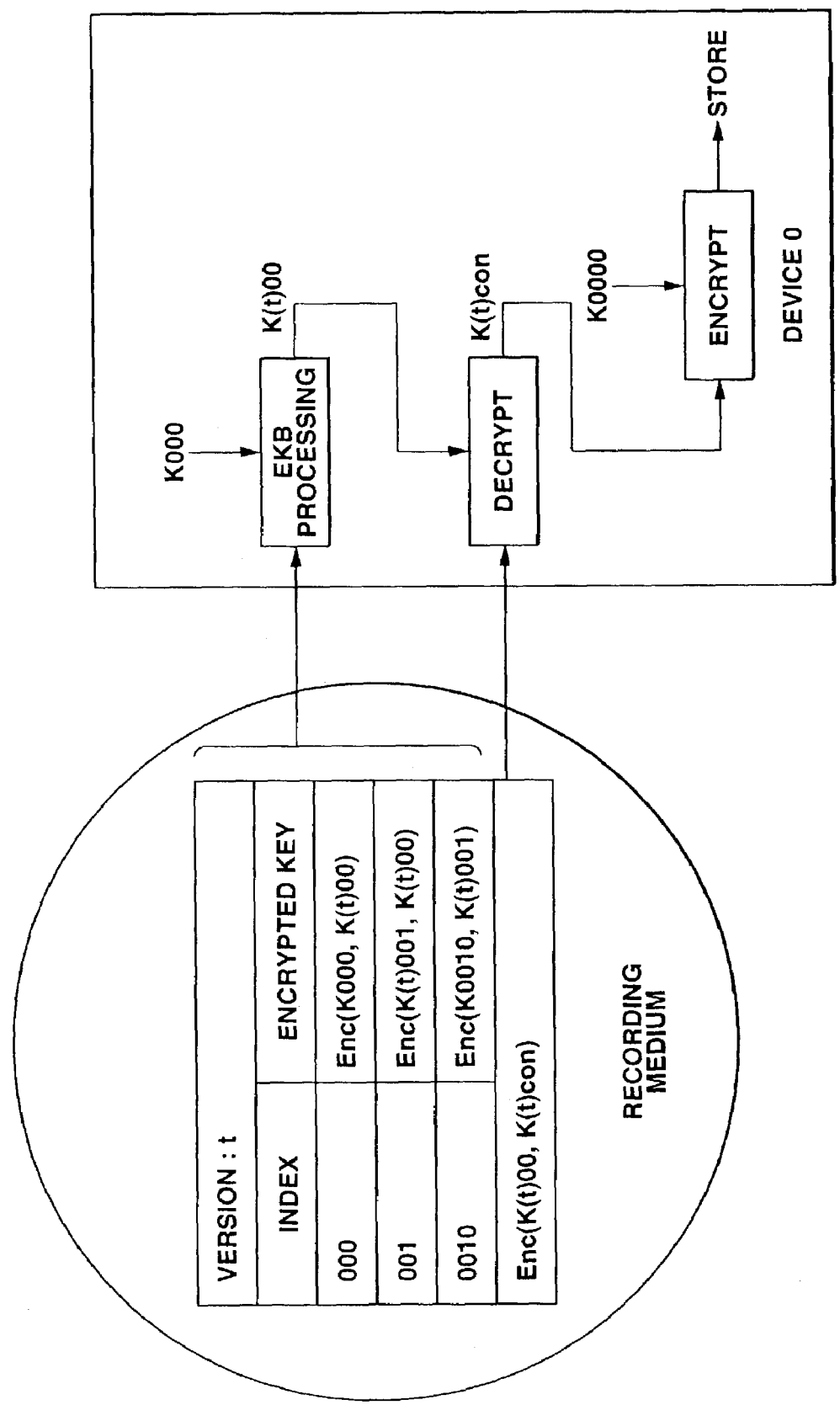
FIG. 5 shows an example of distribution of the enabling key block (EKB) of a content key to the information processing device according to the present invention and an example of decryption processing thereof.

FIG. 5 shows processing at the device 0 where the data Enc(K(t)00, K(t)con) resulting from the encryption of the new common content key K(t)con using K(t)00 and the EKB shown in FIG. 4B are received via a recording medium, as an example of processing for acquiring the content key K(t)con at the time point t. That is, in this example, the encrypted message data based on the EKB is the content key K(t)con.

As shown in FIG. 5, the device 0 generates the node key K(t)00 by EKB processing similar to the above-described processing, using the EKB of the generation stored in the recording medium, that is, the EKB at the time point t, and the node key K000 stored in the device 0 in advance. Moreover, the device 0 decrypts the renewal content key K(t)con by using the decrypted renewal node key K(t)00, and then encrypts and stores the renewal content key K(t) con by using the leaf key K0000 which only the device 0 holds, in order to use it later.

However, if the device 0 has means for safely storing the renewal content key K(t)con, the device 0 need not encrypt the renewal content key K(t)con by the leaf key K0000.

Figure 6:
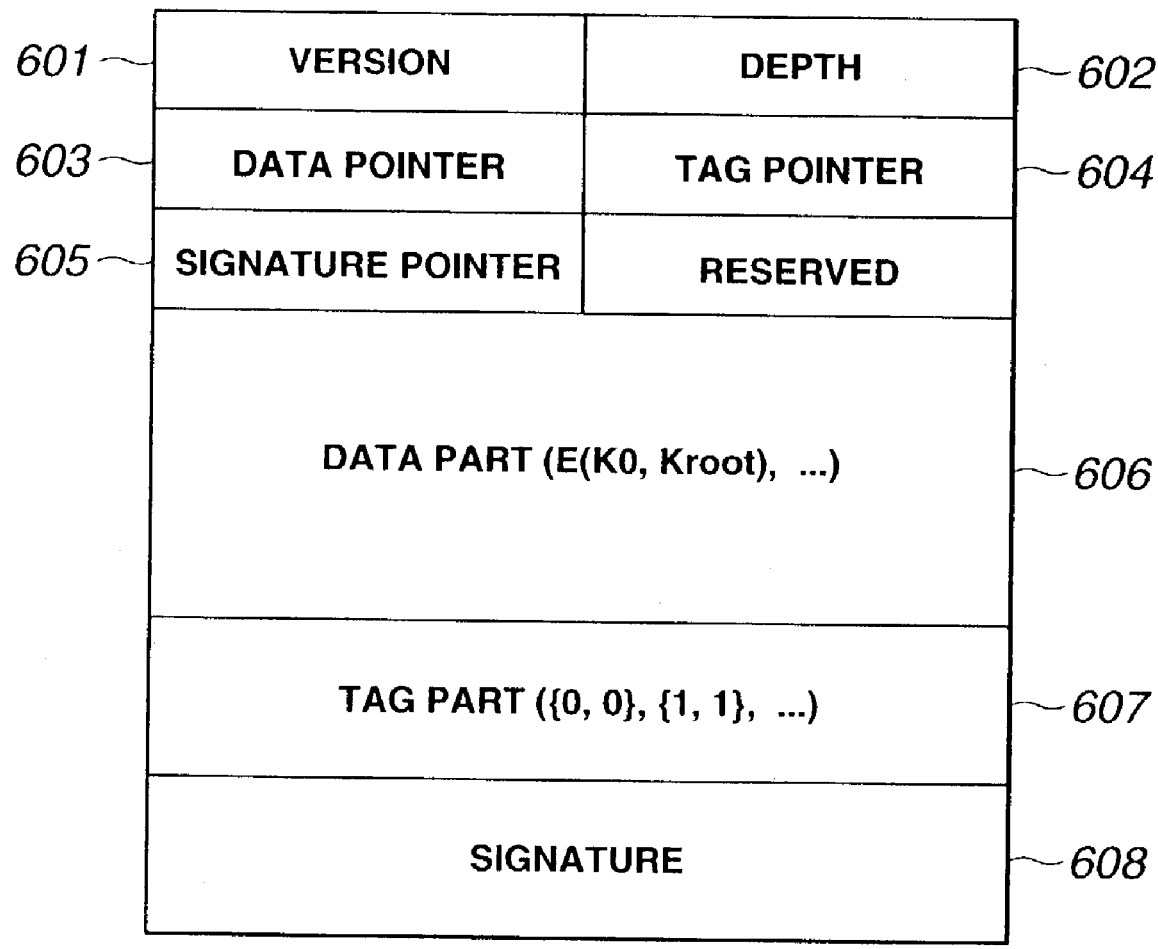
FIG. 6 shows an exemplary format of the enabling key block (EKB) in the information processing device according to the present invention.

FIG. 6 shows an exemplary format of the enabling key block (EKB). Version 601 is an identifier indicating the version of the enabling key block (EKB). The version functions to identify the latest EKB and to represent the correspondence with the content. Depth indicates the number of hierarchical levels of the hierarchical tree with respect to the device at the destination of distribution of the enabling key block (EKB). A data pointer 603 is a pointer indicating the position of a data part in the enabling key block (EKB). A tag pointer 604 is a pointer indicating the position of a tag part. A signature pointer 605 is a pointer indicating the position of a signature.

A data part 606 stores, for example, data obtained by encrypting a node key to be renewed. For example, the data part 606 stores each encrypted key associated with a renewal node key as shown in FIG. 5.

A tag part 607 is a tag indicating the positional relation between the encrypted node key and leaf key stored in the data part. The provision rule for this tag will be described with reference to FIG. 7. FIG. 7 shows an example of sending, as data, the enabling key block (EKB) described above with reference to FIG. 4A. The data in this case is constituted as shown in the table of FIG. 7B. The address of a top node included in the encrypted keys of this case is assumed as a top node address. In this case, since a renewal key K(t)R of the root key is included, the top node address is KR. Data Enc(K(t)0, K(t)R) on the top is situated at a position in a hierarchical tree shown in FIG. 7A. The next data is Enc(K(t)00, K(t)0), which is situated at a position that is on the lower left side of the previous data in the tree. A tag of 0 is set if there is data. A tag of 1 is set if there is no data. The tags are set in the form of {left (L) tag, right (R) tag}. As for the data Enc(K(t)0, K(t)R) on the top, since there is data on the left side and there is no data on the right side, L tag=0 and R tag=1 are set. Hereinafter, the tags are set for all the data, and a data string and a tag string are constituted as shown in FIG. 7C.

The tag is a key location identification tag set for indicating where data Enc(Kxxx, Kyyy) is situated in the tree structure. Since the key data Enc(Kxxx, Kyyy) . . . stored in the data part are simply marshaling of encrypted keys, the positions of the encrypted keys stored as data are made discriminable by the above-described tags. A data structure such as 0: Enc(K(t)0, K(t)root)
00: Enc(K(t)00, K(t)0)
000: Enc(K(t)000, K(t)00). . .

is made possible by using node indexes associated with the encrypted data, as described with reference to FIG. 4, without using the above-described tags. However, such a structure using the indexes causes data redundancy and increases the data volume. This is not preferred for the distribution via a network. On the other hand, by using the above-described tags as index data indicating the key positions, it is possible to discriminate the key positions with a small data volume. As a rule for prescribing the order of tags and nodes, for example, a "breadth first" technique can be used in which description is made sequentially from the left end to the right end at the same depth and then shifts to the left end node on the stage immediately below.

Referring again to FIG. 6, the EKB format will be described further. The signature is a digital signature to be executed by an EKB issuing bureau which issued the enabling key block (EKB), for example, the key control center, the content provider, or the settlement institution. The device which received the EKB confirms that it is the EKB issued by the valid enabling key block (EKB) issuer, by signature verification.

In the above-described example, only the content key is sent together with the EKB. A structure for sending a content encrypted by a content key, together with the content key encrypted by an encryption key such as a root key or a node key, and a content key encryption key encrypted by an EKB, will now be described.

Figures 8A, 8B:
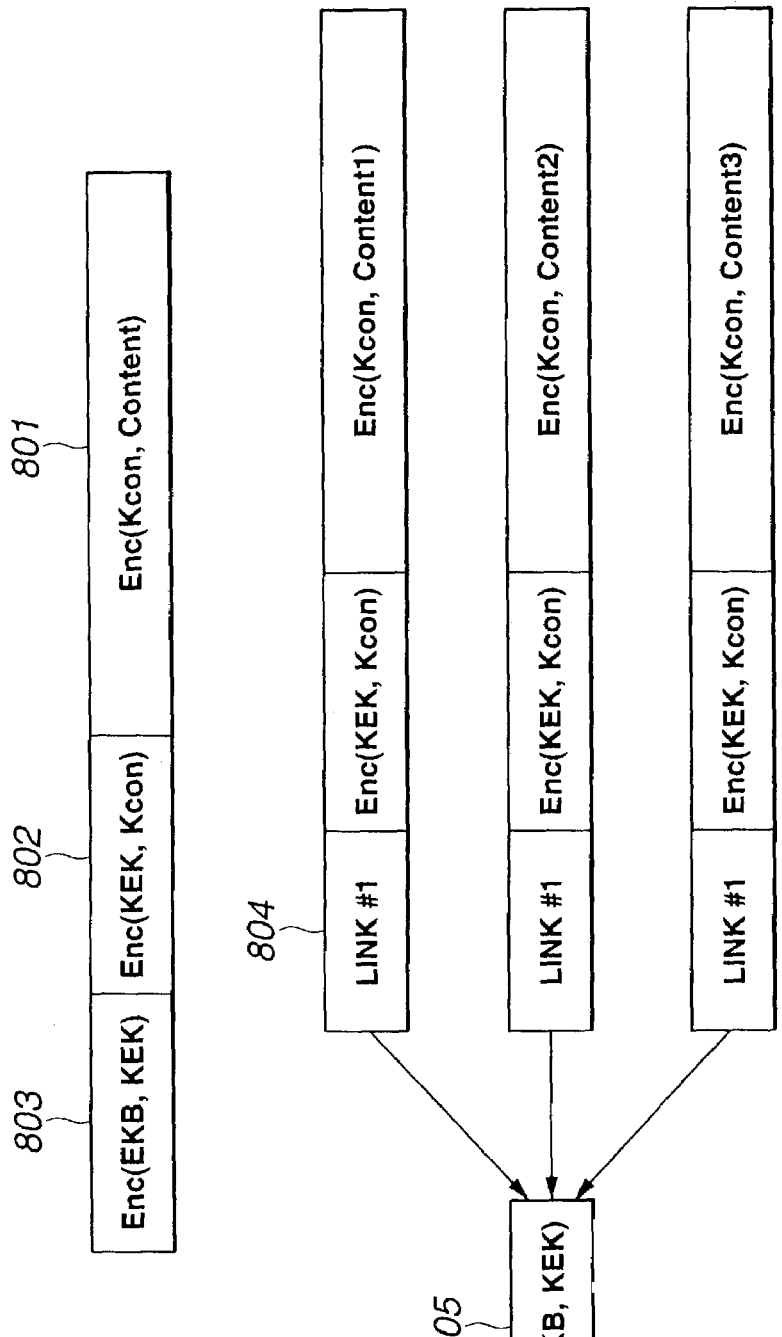
FIGS. 8A and 8B show an exemplary data structure of the enabling key block (EKB) distributed together with the content key and content.

FIG. 8 shows this data structure. In the structure shown in FIG. 8A, Enc(Kcon, content) 801 is data obtained by encrypting a content (content) by a content key (Kcon). Enc(Kroot, Kcon) 802 is data obtained by encrypting the content key (Kcon) by a root key (Kroot). Enc(EKB, Kroot) 803 is data obtained by encrypting the root key (Kroot) by an enabling key block (EKB).

The root key Kroot may also be a node key (K000, K00, . . . ) shown in FIG. 3.

FIG. 8B shows an exemplary structure in the case where a plurality of contents are recorded in a medium and use the same Enc(EKB, Kroot) 805. In such a structure, data indicating the link destination to be linked to Enc(EKB, Kroot) is added to each data, instead of adding the same Enc(EKB, Kroot) to each data.

Figure 9:
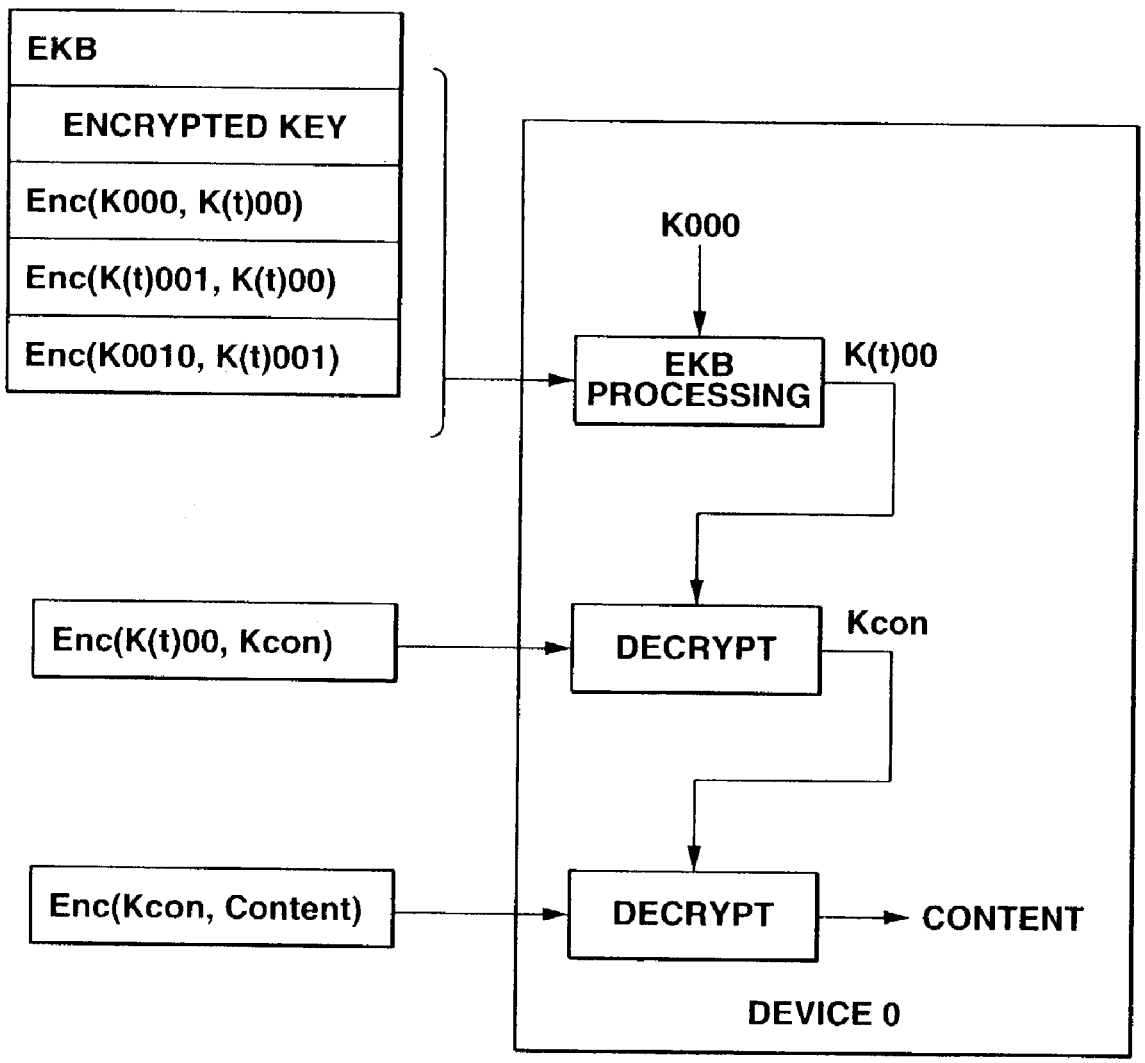
FIG. 9 shows an example of processing in a device in the case the enabling key block (EKB) is distributed together with the content key and content.

FIG. 9 shows an example of processing in the case where the content key Kcon is encrypted by using the renewal node key K(t)00 obtained by renewing the node key K00 shown in FIG. 3. In this case, it is assumed that the device 3 in the group surrounded by the dotted line in FIG. 3 has been revoked because of, for example, key leak, the enabling key block (EKB) shown in FIG. 9, data obtained by encrypting the content key (Kcon) by the renewal node key K(t)00, and data obtained by encrypting the content (content) by the content key (Kcon) are distributed to the other members of the group, that is, the devices 0, 1 and 2. Thus, the devices 0, 1 and 2 can acquire the content.

On the right side in FIG. 9, the decryption procedure in the device 0 is shown. First, the device 0 acquires K(t)00 from the received enabling key block by decryption processing using the device's own leaf key K000. Next, the device 0 acquires the content key Kcon by decryption using K(t)00 and then carries out decryption of the content by using the content key Kcon. By such processing, the content is made usable to the device 0. Similarly, the devices 1 and 2 can acquire the encryption key of the content key by processing the EKB in accordance with their respective processing procedures, and thus can use the content.

The devices 4, 5, 6 . . . of the other groups shown in FIG. 3 cannot acquire K(t)00 by using their own leaf keys and node keys even when the same data (EKB) is received. Similarly, the revoked device 3 cannot acquire K(t)00 by using its own leaf key and node key. Therefore, only the device having the valid right can decrypt and use the content.

By thus using the distribution of a content key using the EKB, it is possible to reduce the data volume and safely distribute an encrypted content that can be decrypted only by a valid user.

While the enabling key block (EKB), content key and encrypted content can be safely distributed via a network, the enabling key block (EKB), content key and encrypted content can be stored on a recording medium such as DVD or CD and then provided to the user. In this case, for decrypting the encrypted content stored on the recording medium, the content key obtained only by decrypting the enabling key block (EKB) stored in the same recording medium is used. Thus, distribution of the encrypted content which can be used only by using the leaf key and node key held only a valid user, that is, distribution of the content limited to an available user device, can be realized with a simple structure.

Figure 10:
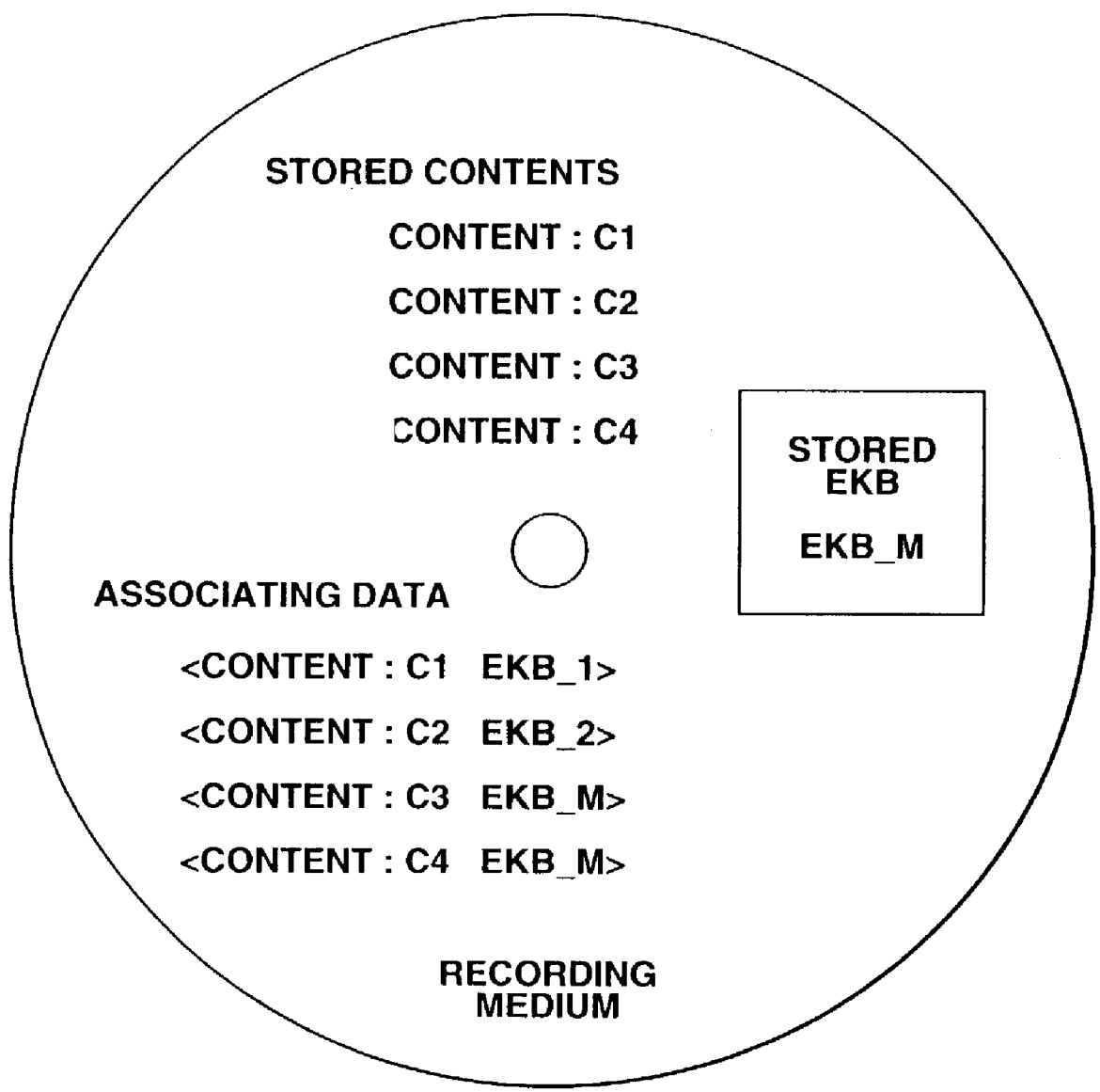
FIG. 10 illustrate the processing in response to the case the enabling key block (EKB) and the content are stored in a recording medium.

FIG. 10 shows an exemplary structure in which an enabling key block (EKB) is stored together with an encrypted content onto a recording medium. In the example shown in FIG. 10, contents C1 to C4 are stored onto a recording medium and data which associates corresponding enabling key blocks (EKB) with the respective stored contents is stored. Moreover, an enabling key block of version M (EKB_M) is stored. For example, EKB_1 is used for generating a content key Kcon1 by encrypting the content C1, and EKB_2 is used for generating a content key Kcon2 by encrypting the content C2. In this example, the enabling key block of version M (EKB_M) is stored on the recording medium and the contents C3 and C4 are associated with the enabling key block (EKB_M). Therefore, content keys for the contents C3 and C4 can be acquired by decrypting the enabling key block (EKB_M). Since EKB_1 and EKB_2 are not stored on the disc, it is necessary to acquire EKB_1 and EKB_2 required for decrypting the respective content keys, by new provision means, for example, distribution via a network or distribution through a recording medium.

Figure 11:
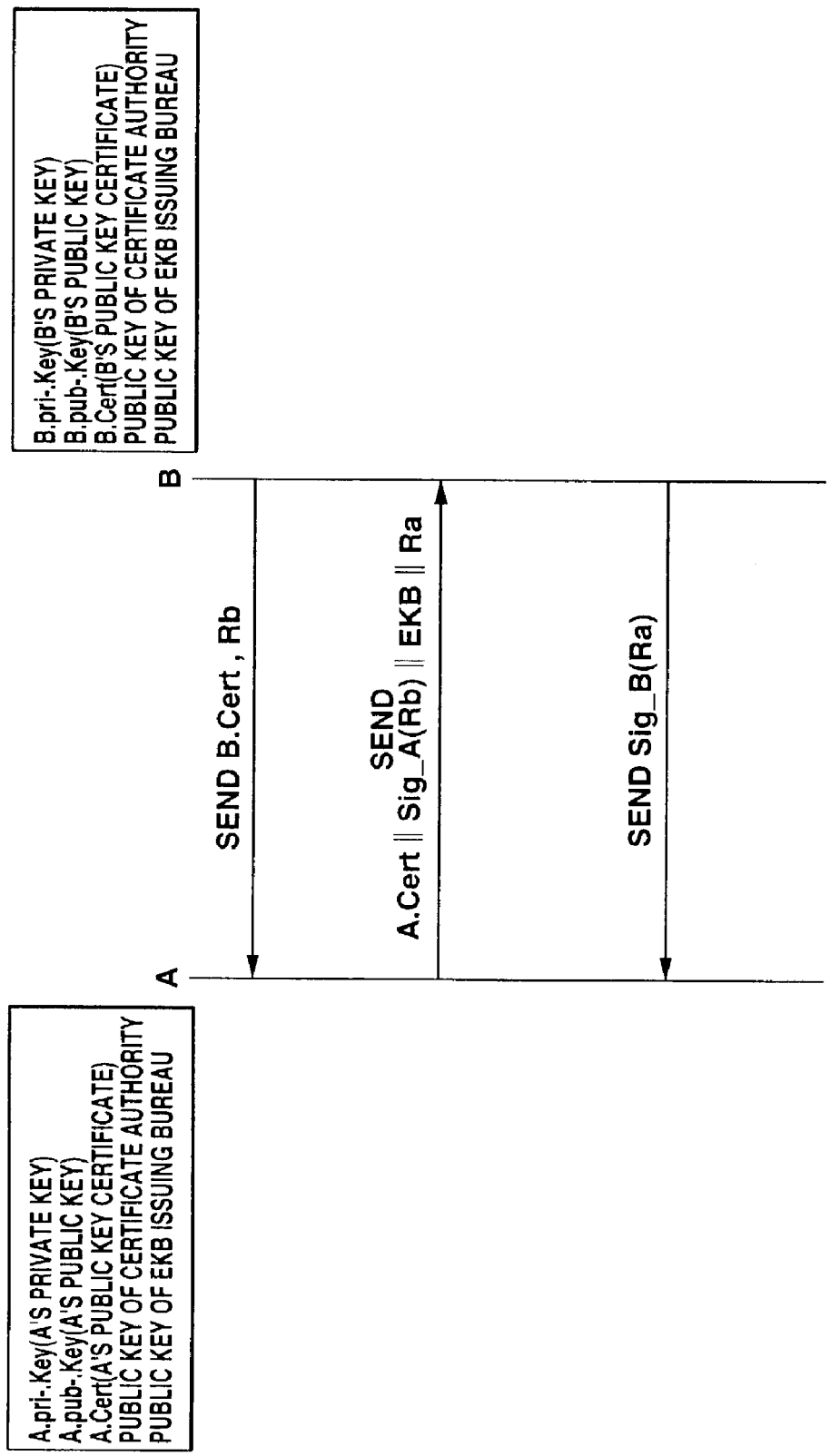
FIG. 11 shows a revocation entity verification sequence involved in authentication processing based on a public key encryption system.

The processing for detecting a revocation entity (e.g., invalid device) using an enabling key block (EKB) will now be described. First, a mutual authentication method using a public key encryption system will be described with reference to FIG. 11. In FIG. 11, A has its own private key [Apri-Key], public key [Apub-Key], and public key certificate [Acert] on which a signature of a certificate authority is given. A also has a public key of the certificate authority, which is the signer of the public key certificate, and a public key of an EKB issuing bureau, which is the signer of the EKB. B has its own private key [Bpri-Key], public key [Bpub-Key], and public key certificate [Bcert] on which a signature of the certificate authority is given, and also has the public key of the certificate authority and the public key of the EKB issuing bureau.

The structure of the public key certificate owned by each of A and B shown in FIG. 11 will be described with reference to FIG. 12. The public key certificate is a certificate issued by the certificate authority (CA) (or issuer authority (IA) in the public key encryption system. This certificate is prepared as the user submits his/her ID, public key and the like to the certificate authority and the certificate authority appends information such as the certificate authority's ID, the expiration date and the like and also appends the certificate authority's signature.

Figure 12:
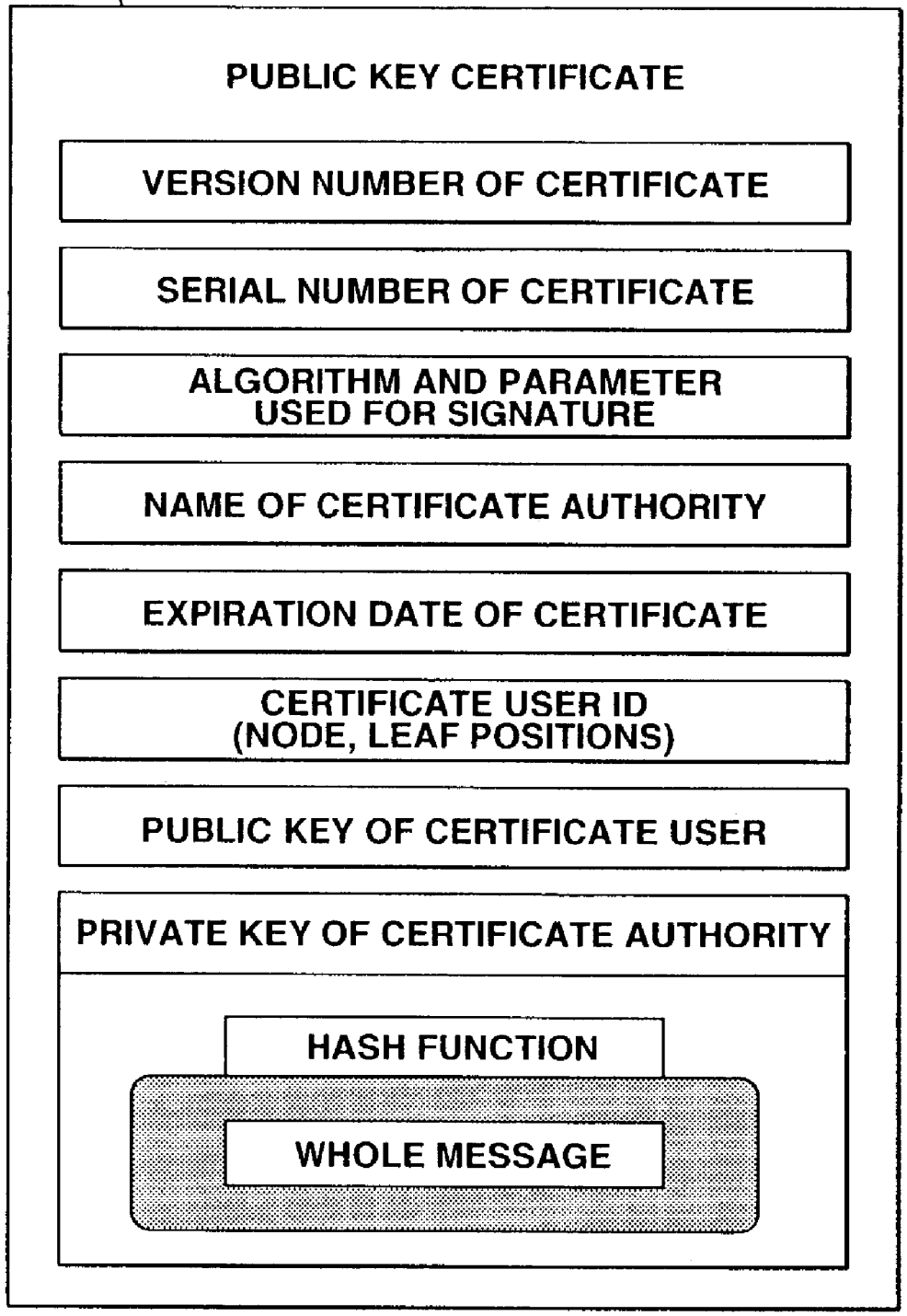
FIG. 12 shows an exemplary structure of a public key certificate.

A public key certificate 51 shown in FIG. 12 contains a whole specification message 52 including the version number of the certificate, the serial number of the certificate which is allocated to the certificate user by the certificate authority, the algorithm and parameter used for the digital signature, the name of the certificate authority, the expiration date of the certificate, the certificate user ID and the public key of the certificate user, and a digital signature 53 of the certificate authority.

The digital signature 53 is data generated by applying a hash function to the whole message including the version number of the certificate, the serial number of the certificate which is allocated to the certificate user by the certificate authority, the algorithm and parameter used for the digital signature, the name of the certificate authority, the expiration date of the certificate, the certificate user ID and the public key of the certificate user, to generate a hash value, and then applying the private key of the certificate authority to the hash value.

The certificate user ID of the public key certificate contains leaf ID as an identification value indicating the node and leaf positions in the above-described key distribution tree structure. In the case of the tree structure of FIG. 3, the device 0 has [ID=0000], the device 1 has [ID=0001], and the device 15 has [ID=1111]. On the basis of such IDs, it is possible to identify the positions (leaf or node) in the tree structure where entities such as the devices are situated.

The mutual authentication processing of FIG. 11 is carried out by using the above-described public key certificate. First, B generates a random number Rb and sends B's public key certificate Bcert and the random number Rb to A. Having received these, A verifies B's public key certificate (B.Cert) by using the public key of the certificate authority. If the verification is NG, it is determined that the public key certificate is invalid. Therefore, the authentication processing is stopped at this point and the authentication is not achieved. If the verification of B's public key certificate (B.Cert) is OK, the EKB held by A's device is traced on the basis of B's leaf ID in B's public key certificate (B.Cert).

As is understood from the foregoing description with reference to FIG. 7, the tags stored in the EKB indicate the presence/absence of data at the left and right nodes of the device's own node, in the form of 0, 1. That is, 0 is set when there is data while 1 is set when there is no data. The EKB tracing processing based on the leaf ID is carried out by using the tags based on such condition setting.

Figure 13B:
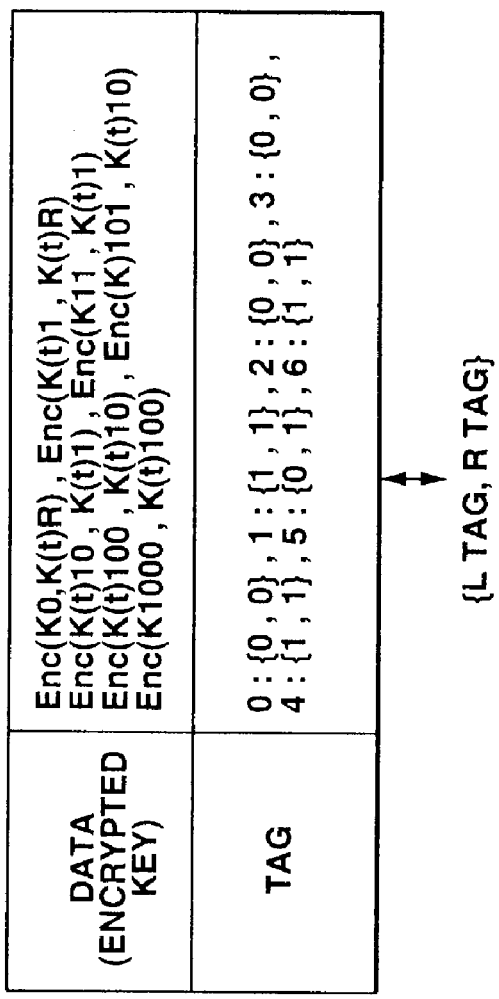
FIGS. 13A and 13B show steps of EKB trace processing for determination of a revocation entity.
Figure 13A:
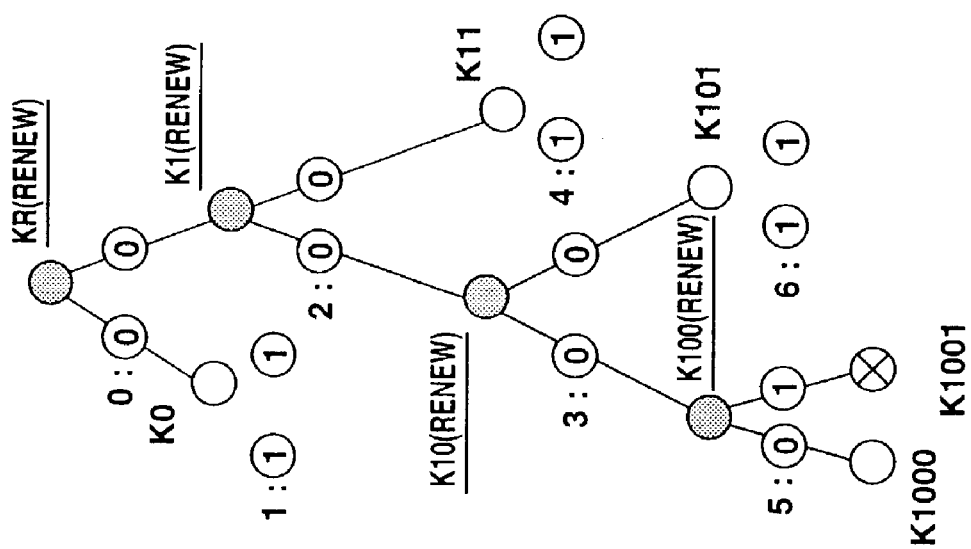

The tracing of the EKB based on the leaf ID will be described with reference to FIG. 13. As shown in FIG. 13A, a device having a leaf key K1001 is assumed as a revoked device [1001]. In this case, the EKB has encrypted keys and tags as shown in FIG. 13B. The EKB shown in FIG. 13B has KR, K1, K10 and K100 renewed in order to revoke the one device [1001] shown in FIG. 13A.

By processing this EKB, a root key K(t)R which has all the leaves renewed except for the revoked device [1001] can be acquired. Specifically, as for the leaves on the levels below the node key K0, the node key K0 which is not renewed is held in the devices. Therefore, the renewed root key K(t)R can be acquired by decrypting Enc(K0, K(t)R) using K0. As for the leaves below K11, a renewal node key K(t)1 is acquired by decrypting Enc(K11, K(t)1) using K11 which is not renewed, and the renewed root key can be acquired by further decrypting Enc(K(t)1, K(t)R) using K(t)1. As for the leaves blow K101, too, the renewed root key can be similarly acquired except for the increase of the decryption step by one.

A device [1000] having a leaf key K1000 which is not revoked can decrypt Enc(K1000, K(t)100) using its own leaf key to acquire K(t)100 and then sequentially decrypt the node keys on the upper levels, thus acquiring the renewed root key.

Only the revoked device [1001] cannot acquire a renewal node key K(t)100 on the level immediately above its own leaf by the EKB processing and therefore cannot acquire the renewed root key K(t)R.

To the valid device which is not revoked, the EKB having the data part and tag shown in FIG. 13B is distributed from the EKB issuing bureau and the EKB is stored in the device.

In the mutual authentication, if the revoked device [ID=1001] shown in FIG. 13A and a certain content provider are carrying out mutual authentication based on the public key system shown in FIG. 11, the content provider receives a public key certificate from the revoked device [ID=1001] of FIG. 13A, verifies the public key certificate, and then acquires ID from the public key certificate. This ID is [1001], which indicates the leaf position in the EKB distribution tree structure.

Having received the ID [1001], the content provider verifies whether or not the device corresponding to the leaf with ID=1001 is set as a valid leaf device in the EKB. This verification is executed as the processing for determining whether the leaf [1001] can acquire the renewed root key K(t)R or not.

For example, it is evident that a leaf belonging to a level below an unrenewed node key (K0, K1 or the like in FIG. 13A) is revoked, and the corresponding device can be determined as a valid device. As for a leaf belonging to a level below a renewal node key, it is possible determine whether the entity is revoked or not, depending on whether encryption data which enables acquisition of the renewal node key is stored in the EKB or not.

An example of carrying out the EKB tracing processing based on the tag stored in the EKB as an example of the determination processing will now be described. The EKB tracing processing is processing for determining whether the key distribution tree can be traced from the upper root key or not. For example, [1001], which is the ID of the leaf [1001] in FIG. 13A, is divided into four bits [1], [0], [0] and [1], and the tree is traced sequentially from the most significant bit to the lower bits. If the bit is 1, the tracing goes to the right. If the bit is 0, the tracing goes to the left.

From the root shown in FIG. 13A, since the most significant bit of ID[1001] is 1, the tracing goes to the right. The first tag in the EKB is 0:{0, 0} and it is determined that there is data on both sides. The tracing goes to the right to reach K1. Next, the tracing goes to a node below K1. The second bit of ID[1001] is 0 and the tracing goes to the left. The tag indicating the presence/absence of data on the level below K1 is 2:{0, 0} shown in FIGS. 13A and 13B and it is determined that there is data on both sides. The tracing goes to the left to reach K10. Moreover, the third bit of ID[1001] is 0 and the tracing goes to the left. The tag indicating the presence/absence of data on the level below K10 is 3:{0, 0} shown in FIGS. 13A and 13B and it is determined that there is data on both sides. The tracing goes to the left to reach K100. Furthermore, the least significant bit of ID[1001] is 1 and the tracing goes to the right. The tag indicating the presence/absence of data on the level below K100 is 5:{0, 1} shown in FIGS. 13A and 13B and there is no data on the right side. Therefore, it is determined that the node [1001] cannot be reached and that the device of ID[1001] is a device which cannot acquire the renewed root key based on the EKB, that is, a revoked device.

The device ID having the leaf key K1000 of FIG. 13A is [1000] and the node [1000] can be reached by executing the EKB tracing processing based on the tag within the EKB as described above, that is, the processing for tracing the tree. Therefore, it is determined that the device is a valid device which is not revoked and can acquire the renewed root key based on the EKB.

A leaf on a level below an unrenewed node key such as K0 or K11 cannot be reached. In this case, however, an unrenewed terminal node can be reached. With respect to the leaf on the level below the unrenewed node, the EKB processing can be carried out by using the unrenewed node key and the renewed root key can be acquired. Therefore, the device corresponding this leaf is a valid device. Whether the node key is a renewed one or not can be determined in accordance with the tag corresponding to that node. The tags corresponding to the unrenewed node keys K0, K11 and K101 are 1:{1, 1}, 4:{1, 1} and 6:{1,1}, which indicate that lower nodes and leaves exist but encryption key data is not held in the EKB. Therefore, it is determined that the devices corresponding to these lower leaves are valid device which are not revoked.

Figure 14B:
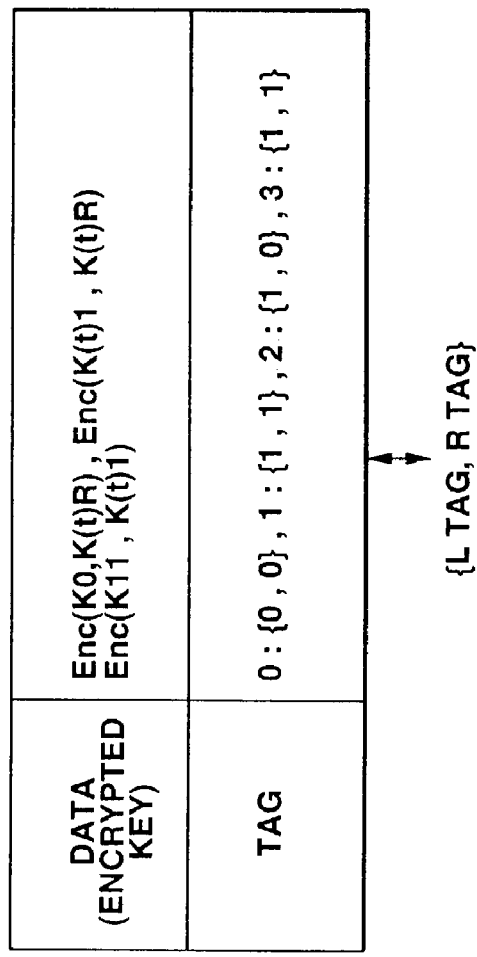
FIGS. 14A and 14B show steps of EKB trace processing for determination of a revocation entity.

While the example shown in FIG. 13 is a revocation mode for only one device, it is possible to collectively revoke all the leaf devices below a certain node, as shown in FIG. 14. In this case, data (encrypted key) and tag in the EKB are constituted as shown in FIG. 14B.

For example, if the content provider received a public key certificate from a revoked leaf device corresponding to K1000 and thus acquired ID[1000], the processing for tracing the tree based on the tag of the EKB is carried out on the basis of this ID[1000].

Figure 14A:
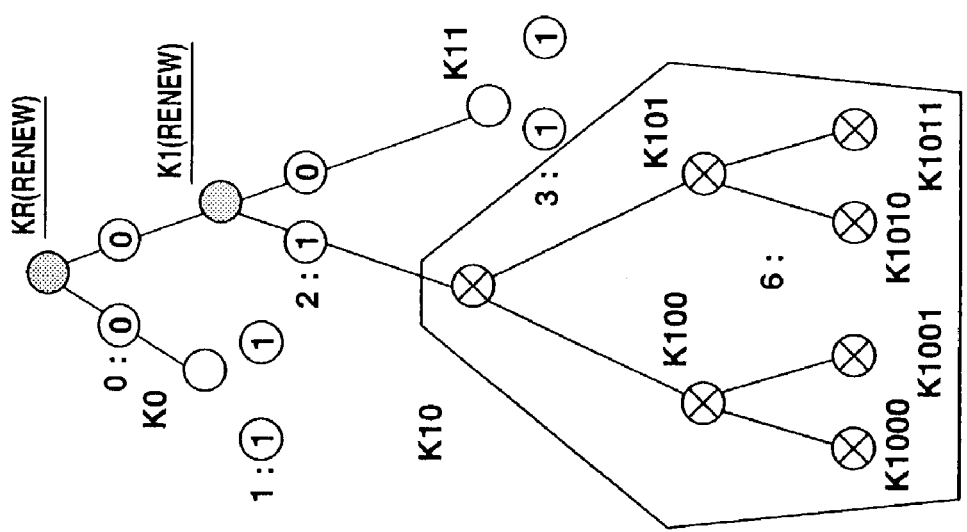

From the root of FIG. 14A, the most significant bit of ID[1000] is 1 and the tracing goes to the right. The first tag within the EKB is 0:{0, 0} and it is determined that there is data on both sides. The tracing goes to the right to reach K1. Next, the tracing goes to a node on a level below K1. The second bit of ID[1000] is 0 and the tracing goes to the left. The tag indicating the presence/absence of data on the level below K1 is 2:{1, 0} shown in FIGS. 13A and 13B and there is no data on the left side. Therefore, the node [1000] cannot be reached. The tag corresponding to the terminal node K1 in this case is {1, 0}, not {1, 1} which indicates the absence of data on the lower level.

The tag {1, 0} indicates that encryption key data for acquiring renewed K1(t) which can be decrypted only at a lower node or leaf on the right side of K1 is stored in the EKB.

In this manner, if the final point to be reached on the basis of the leaf ID is a node and the tag corresponding to the final node has a value other than {1, 1}, it means that encryption key data on the lower level is held in the EKB. In this case, since the leaf device having that ID cannot acquire the renewed root key by processing the EKB, the device is determined as a revoked device.

It is thus possible to determine whether the communicating party is revoked or not, on the basis of the leaf ID stored on the public key certificate acquired from the communicating party in the authentication processing.

Referring again to FIG. 11, the description of the authentication processing sequence will be continued. A executes the processing for tracing the tree based on the tag in the EKB as described above on the basis of B's leaf ID taken out from the public key certificate received from B and then determines whether or not the leaf position indicated by the ID is a position where a renewed root key can be acquired by the EKB processing. If the leaf position is a position where the EKB processing is possible, the device is determined as a valid device which is not revoked. If the leaf position is a position where the EKB processing not possible, the device is determined as a revoked invalid device and the processing is stopped, assuming that the authentication is not achieved.

If it is determined that the leaf device is a device which can carry out the EKB processing based on the ID, a signature is given with A's private key to the random number Rb received from B, thus generating Sig_A(Rb), and a random number Ra is generated. A sends these Sig_A(Rb) and Ra together with the EKB and the public key certificate A.Cert housed in A's own device to B.

B verifies A's public key certificate (A.Cert) by using the public key of the certificate authority. If the verification is OK, the received EKB is verified by using the public key of the EKB distributor. The EKB is signed with the private key of the EKB distributor in order to prevent falsification. B carries out the verification processing by using the EKB public key. If the verification is OK, B acquires A's leaf ID in A's public key certificate (A.Cert) and traces the EKB on the basis of the leaf ID similarly to the above-described case referring to FIGS. 13 and 14.

If the EKB cannot be traced, A is determined as a revoked device and the subsequent processing is stopped, assuming that the authentication is not achieved. A is not necessarily a device and may be a content provider or a service provider, or may be a node having a key of an intermediate node which is not a leaf on the bottom of the tree structure shown in FIGS. 13 and 14. For example, if A is a node corresponding to the node key position of K10 shown in FIGS. 13 and 14, ID of the content provider or service provider is [10] and the processing for tracing the EKB using the tag of the EKB is executed on the basis of ID[10], thus determining whether the device is revoked or not.

If the EKB could be traced by the tracing processing, the data Sig_A(Rb) received from A is verified by using the public key A.pub-Key in A's public key certificate (A.Cert). If the verification is OK, Ra is signed with B.pri-Key (B's private key), thus generating Sig_B(Ra). The generated Sig_B(Ra) is sent to A.

Having received Sig_B(Ra), A verifies Sig_B(Ra) by using B's public key acquired from B's public key certificate (B.Cert). If the verification is OK, it is determined that the authentication is achieved.

Figure 15:
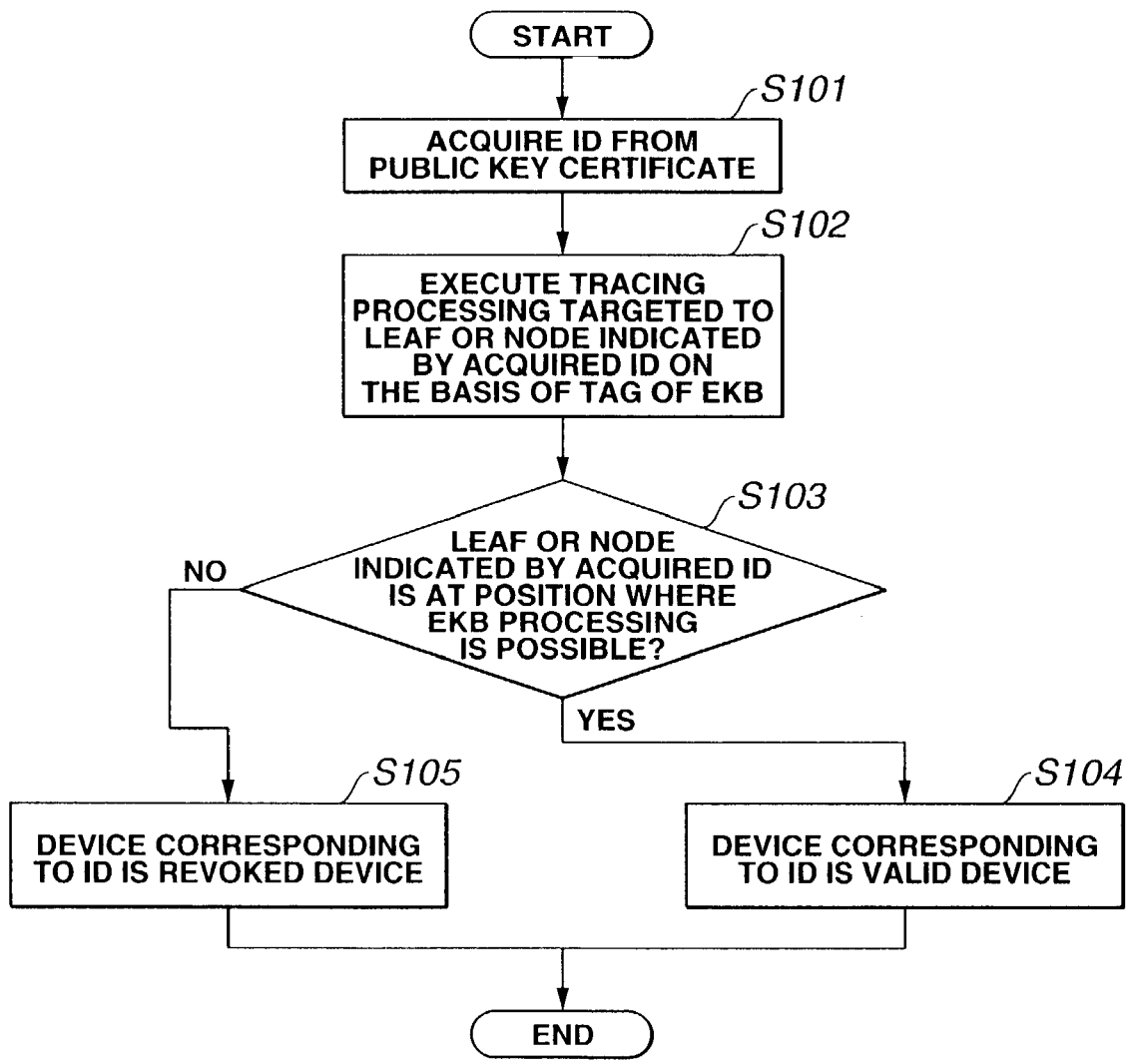
FIG. 15 shows steps of EKB trace processing for determination of a revocation entity.

FIG. 15 shows a flowchart for the processing for determining a revoked device by using the EKB. Each step of the flow will now be described. At step S101, ID is acquired from the public key certificate of the communicating party (authentication party). At step S102, using the acquired ID, the tracing processing targeted to a leaf or node indicated by the ID on the basis of the tag of the EKB.

The tracing processing is executed in accordance with the procedure described above with reference to FIGS. 13 and 14. Wether or not the leaf or node indicated by the ID could be reached as a result of the tracing processing is determined, and even if the leaf or node cannot be reached, whether or not the EKB processing is possible at the leaf or node indicated by the ID, that is, whether or not the acquisition of a renewed root key is possible, is determined (S103).

If it is determined that the ID is at a position where the EKB processing is possible, the processing goes to step S104 and it is determined that the device corresponding to the ID is a valid device which is not revoked. On the other hand, if it is determined that the ID is at a position where the EKB processing is not possible, the processing goes to step S105 and it is determined that the device corresponding to the ID is a revoked invalid device.

An example of the content use processing involving the revoked device (invalid device) determination processing using the enabling key block (EKB) will now be described. In an example shown in FIG. 16, a provider A encrypts a content and distributes the encrypted content to a device (ID=00xx).

The content provider A sends A's public key certificate [A.Cert], data generated by signing a content key with A's own private key [Sig_A(Kcon)], the enabling key block [EKB], data generated by encrypting the content key with a renewed root key [Enc(K(t)root, Kcon)], and data generated by encrypting the content with the content key [Enc(Kcon, Content)], to the device [00xx].

Having received these data, the device [00xx] first verifies the received A's public key certificate [A.Cert] by using the public key of the certificate authority. If the verification is OK, the device [00xx] acquires A's public key and A's ID from A's public key certificate.

Next, the device [00xx] verifies the data generated by signing the content key with A's private key [Sig_A(Kcon)], by using A's public key taken out from A's public key certificate [A.Cert]. If the verification is OK, the device [00xx] then executes the above-described EKB tracing processing on the basis of A's ID taken out from the public key certificate [A.Cert] and determines whether or not the EKB processing is possible at a leaf or node position indicated by A's ID.

If it is determined that A does not correspond to a revoked leaf or node as a result of the EKB tracing processing, the device [00xx] acquires the renewed root key K(t)root from the received enabling key block by the decryption processing using its own leaf key and node key. Next, the device [00xx] acquires the content key Kcon by decrypting the renewed root key K(t)root. Moreover, the device [00xx] decrypts the content by using the acquired content key Kcon. By such processing, the content is made usable to the device [00xx].

In the above-described processing, after the public key certificate of the content distributor is acquired, the verification of the public key certificate is carried out, and after the public key and ID of the content distributor are acquired, the EKB processing and the decryption of the content are carried out. Therefore, the content distributor can be specified on the basis of the ID and distribution of a content from an unknown distributor can be prevented.

Figure 16:
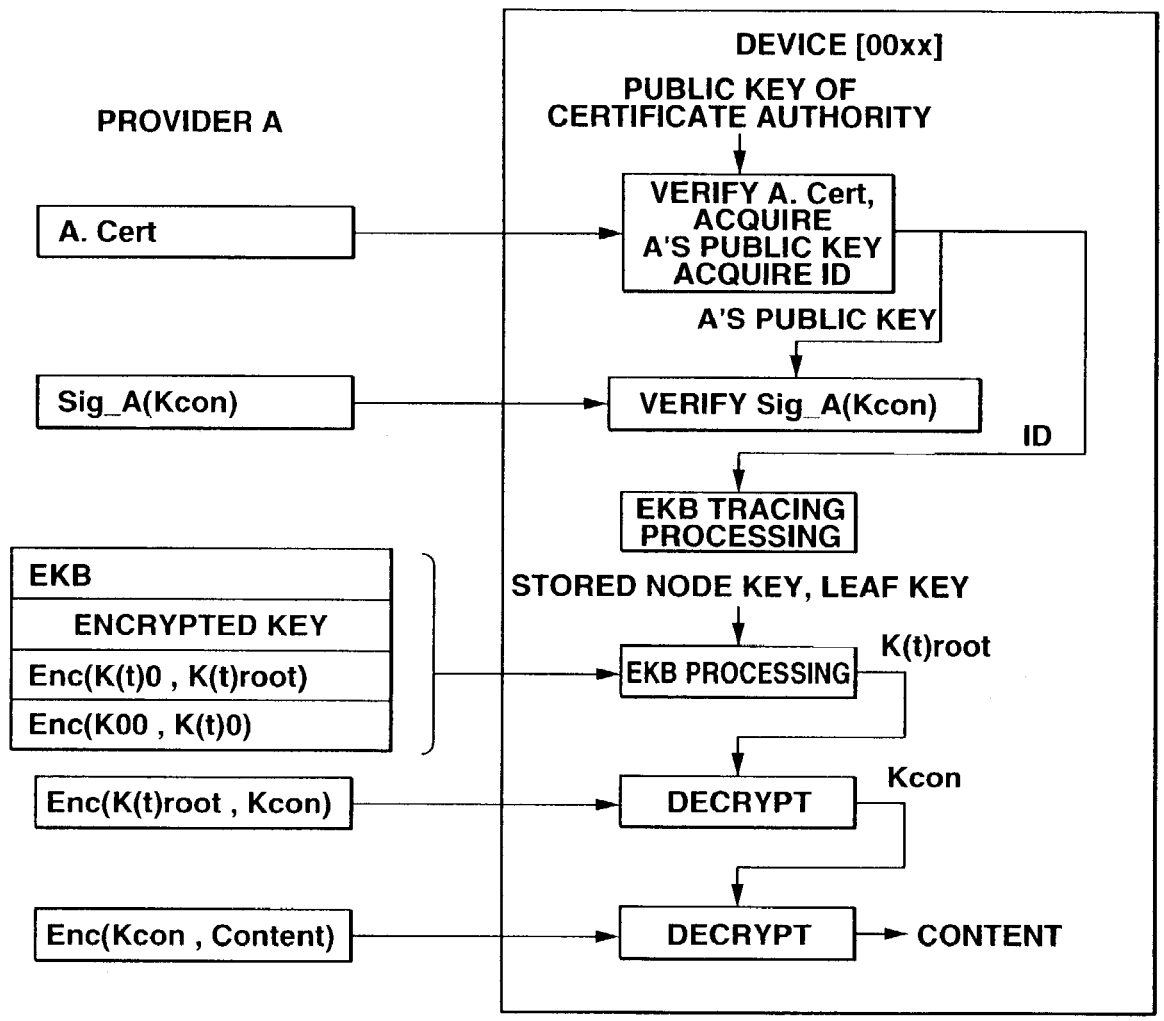
FIG. 16 illustrates content distribution processing using the EKB and public key certificate.

In the example shown in FIG. 16, the provider A encrypts the content and distributes the encrypted content to the device (ID=00xx), and the signature to the content key is given by the provider A and is verified by the device using the public key of the provider A. However, the content key may be signed with the device's own private key and thus may be recorded onto the recording medium of the device, for example, when recording a content generated or acquired by the user to the recording medium of the device, not at the time of the recording/reproduction processing at the device of the content distributed from another provider. By thus signing the content key as a encryption key for the content stored in the recording medium, it is essential to execute the verification of the signature of the content key by using the public key of the device when reproducing the content, and it is possible to eliminate storage/reproduction of invalid contents.

In the above-described structure, encryption keys are constituted as the root key, the node keys and the leaf keys in the hierarchical tree structure of FIG. 3, and the content key and the like are encrypted and distributed together with the enabling key block (EKB). Hereinafter, a structure in which a hierarchical tree structure defining node keys and the like is classified by category of each device so as to execute efficient key renewal processing will be described.

Figure 17:
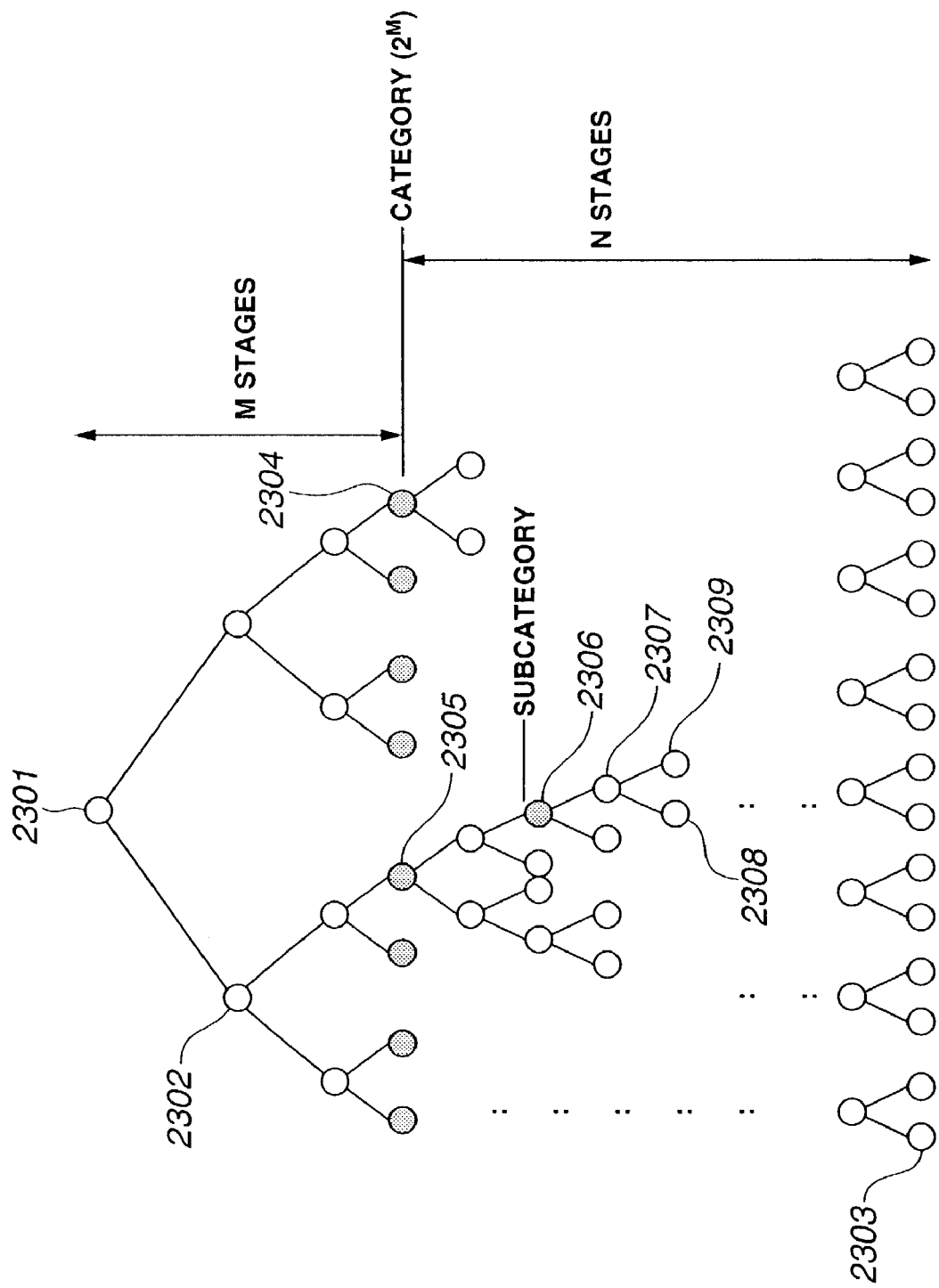
FIG. 17 illustrates an example of category classification of a hierarchical tree structure.

FIG. 17 shows an example of category classification of a hierarchical tree structure. In FIG. 17, a root key Kroot 2301 is set on the top of the hierarchical tree structure. A node key 2302 is set on the subsequent middle stage and a leaf key 2303 is set on the bottom. Each device holds its own leaf key, a series of node keys to reach the root key from the leaf key, and the root key.

For example, a node on the Mth stage from the top is set as a category node 2304. That is, each of the nodes on the Mth stage is caused to be a device setting node of a specific category. With one node on the Mth stage assumed as an apex, nodes and leaves on the (M+1)th and subsequent stages are caused to be nodes and leaves related to devices included in that category.

For example, a category [memory stick (trademark)] is set for one node 2305 on the Mth stage of FIG. 17, and nodes and leaves subsequent to this node are set as nodes and leaves dedicated to the category which includes various devices using a memory stick. That is, the node 2305 and the subsequent nodes and leaves are defined as a set of related nodes and leaves of the devices included in the category of memory stick.

Moreover, a node which is some stages below the Mth stage can be set as a subcategory node 2306. For example, a node which is two stages below the node 2305 of the category [memory stick] is set as a node of a subcategory [reproduction-only unit] included in the category of device using a memory stick, as shown in FIG. 17. Furthermore, below the reproduction-only unit node 2306 as a subcategory node, a node of a telephone with a music reproduction function 2307 included in the category of reproduction-only unit is set, and a [PHS] node 2308 and a [portable telephone] node 2309 included in the category of telephone with a music reproduction function can be set below the node 2307.

The category and subcategory can be set not only by type of device but also by arbitrary unit such as a node independently managed by a certain manufacturer, content provider or settlement institution, that is, processing unit, control unit or provided service unit (generally referred to as entity). For example, by setting one category node as an apex node dedicated to a game machine XYZ sold by a game machine manufacturer, it is possible to sell the game machine by the manufacturer in which node keys and leaf keys of the stages below the apex node are stored. After that, an enabling key block (EKB) constituted by the apex key and the subsequent node keys and leaf keys is generated and then distribution of an encrypted content or distribution and renewal of various keys is carried out. Thus, it is possible to distribute data which is usable only to the devices corresponding to the apex node and the subsequent nodes and leaves.

By thus setting one node as an apex and setting subsequent nodes as related nodes of categories or subcategories defined by the apex node, it is possible that a manufacturer, a content provider or the like which controls one apex node on a category stage or a subcategory stage independently generates an enabling key block (EKB) based on that node as an apex and distributes the EKB to devices belonging to the apex node and the subsequent nodes. Key renewal can be carried out without affecting devices belonging to nodes of the other categories, not belonging to the apex node.

In addition to the key renewal using the EKB by category, batched revocation by category or by specific group is possible. If many revoked nodes or revoked leaves are included, revocation determination based on the above-described EKB tracing processing is effective. This is because if a list having the IDs of all the revoked device recorded therein is distributed to each device, the problem of the storage use area of the list arises and the burden of ID collation processing is increased. The above-described EKB tracing processing based on ID is the tracing processing based on the tag within the EKB, in which the processing burden is extremely light and it is possible immediately determine whether revocation is made or not.

As described above, since the EKB is signed by the EKB issuer so that falsification can be checked, the validity of the EKB can be verified by the signature verification and secure revocation determination is realized.

While the present invention is described above with reference to some embodiments, it is obvious that modification and changes of the above-described embodiments may be made by those skilled in the art without departing from the scope of the present invention. That is, the above-described embodiments disclose the present invention in the form of examples and should not be interpreted as limitations. To determine the scope of the present invention, the description of claims should be referred to.

INDUSTRIAL APPLICABILITY

The information processing device and method according to the present invention makes it possible to determine a device or a service provider as a revoked entity on the basis of an enabling key block (EKB) using a hierarchical key distribution tree employed in distribution of a content key and the like. Therefore, a revocation list having IDs of revoked entities stored therein need not be distributed to devices and each device no longer needs to store the list.

Moreover, in the information processing device and method according to the present invention, ID which enables position identification in the hierarchical key distribution tree is stored in a public key certificate and tracing processing using a tag of the enabling key block (EKB) is executed on the basis of the ID acquired from the public key certificate. Therefore, the reliability of the ID is guaranteed by the public key certificate and secure determination of a revoked entity is made possible.

The invention claimed is:

1. An information processing device having a key set consisting of a leaf key assigned to each leaf and node keys assigned on paths from the leaf key to an upper layer of a hierarchical tree structure having assigned leaves and nodes, the information processing device comprising:
  a processor configured to trace a key location identification tag identifying a location in an enabling key block including encrypted key data resulting from encryption of a renewal node key of the hierarchical tree structure by a subordinate node key or a leaf key, based on a identifier or an entity corresponding to a node or a leaf; the processor verifying whether the entity is to be revoked in accordance with the trace; and
  encryption processing means configured to decrypt the enabling key block using the key set,
  wherein the processor determines verification of the information processing device by determining whether the encryption processing means can decrypt the enabling key block or not.

2. The information processing device as claimed in claim 1, wherein the identifier of the entity to be verified includes position information of the corresponding node or leaf of the entity in the hierarchical tree structure, and
  the key location identification tag in the enabling key block (EKB) is a tag for identifying the presence or absence of encrypted key data on a subordinate layer of each of the encrypted key data in the enabling key block (EKB),
  the processor tracing the tag on the basis of the position information of the entity in the hierarchical tree structure, included in the identifier of the entity to be verified.

3. The information processing device as claimed in claim 1, wherein the identifier of the entity to be verified includes position information of the corresponding node or leaf of the entity in the hierarchical tree structure, and
  the key location identification tag in the enabling key block (EKB) is a tag for identifying the presence or absence of encrypted key data on a subordinate layer of each of the encrypted key data in the enabling key block (EKB),
  the information processing device determining whether the node position or leaf position corresponding to the entity to be verified can be reached based on the trace of the tag of the identifier of the entity to be verified, and in case the position cannot be reached, determination as to whether decryption is possible is executed by determining whether the entity belongs to a subordinate layer of a node key that is not renewed.

4. The information processing device as claimed in claim 1, wherein the identifier of the entity to be verified is an identifier stored in a public key certificate of the entity, the information processing device acquiring the identifier of the entity to be verified from the public key certificate of the entity.

5. The information processing device as claimed in claim 1, wherein in decrypting an encrypted content provided from an entity corresponding to a node or leaf constituting the hierarchical tree structure, the identifier of the entity is acquired from a public key certificate of the entity and the trace processing of the tag of the enabling key block (EKB) based on the acquired identifier is executed, thus determining whether the entity is a revocation entity or not and executing decryption processing of the encrypted content based on a content encryption key Kcon acquired from the enabling key block (EKB).

6. An information processing method in an information processing device, associated with respective leaves of a hierarchical tree structure in which unique keys are associated with nodes and leaves, having a key set stored therein, the key set consisting of a leaf key corresponding to each leaf of the hierarchical tree structure and node keys on paths to upper layers of the hierarchical tree structure, wherein the information processing method comprises the steps of:

verifying whether an entity corresponding to a node or a leaf is a revocation entity, which is an entity to be revoked, by determining whether an enabling key block (EKB) including encrypted key data resulting from encryption of a renewal node key of the hierarchical tree structure by a subordinate node key or a leaf key can be decrypted by a stored key set for an entity to be verified, and determining whether decryption is possible by tracing a key location identification tag in the enabling key block (EKB) based on an identifier of the entity to be verified.

7. The information processing method as claimed in claim 6, wherein the identifier of the entity to be verified includes position information of the corresponding node or leaf of the entity in the hierarchical tree structure, and the key location identification tag in the enabling key block (EKB) is a tag for identifying the presence or absence of encrypted key data on a subordinate layer of each of the encrypted key data in the enabling key block (EKB), the information processing method tracing the tag on the basis of the position information of the entity in the hierarchical tree structure, included in the identifier of the entity to be verified.

8. The information processing method as claimed in claim 6, wherein the identifier of the entity to be verified includes position information of the corresponding node or leaf of the entity in the hierarchical tree structure, and the key location identification tag in the enabling key block (EKB) is a tag for identifying the presence or absence of encrypted key data on a subordinate layer of each of the encrypted key data in the enabling key block (EKB), the information processing method comprising executing determination as to whether the node position or leaf position corresponding to the entity to be verified can be reached by the trace processing of the tag based on the identifier of the entity to be verified, and in case the position cannot be reached, executing determination as to whether decryption is possible or not by determining whether the entity belongs to a subordinate layer of a node key that is not renewed.

9. The information processing method as claimed in claim 6, wherein the identifier of the entity to be verified is an identifier stored in a public key certificate of the entity, the information processing method comprising acquiring the identifier of the entity to be verified from the public key certificate of the entity.

10. The information processing method as claimed in claim 6, wherein in decrypting an encrypted content provided from an entity corresponding to a node or leaf of the hierarchical tree structure, the identifier of the entity is acquired from a public key certificate of the entity and the trace processing of the tag of the enabling key block (EKB) based on the acquired identifier is executed, thus determining whether the entity is a revocation entity or not and executing decryption processing of the encrypted content based on a content encryption key Kcon acquired from the enabling key block (EKB).

11. A program storage medium for providing a computer program which causes a computer system to execute information processing in an information processing device, associated with respective leaves of a hierarchical tree structure in which unique keys are associated with nodes and leaves, having a key set stored therein, the key set consisting of leaf key corresponding to each leaf of the hierarchical tree structure and node keys on paths to upper layers, the computer program stored in the storage medium comprising a verification processing step as to whether an entity corresponding to a node or a leaf is a revocation entity as an entity to be revoked, the verification processing step including a step of execution by determining whether or not an enabling key block (EKB) including encrypted key data resulting from encryption of a renewal node key of the hierarchical tree structure by a subordinate node key or a leaf key can be decrypted by a stored key set for an entity to be verified, the step of determining whether decryption is possible or not including a step of execution by trace processing of a key location identification tag in the enabling key block (EKB) based on an identifier of the entity to be verified.

* * * * *